US008805352B2

(12) United States Patent
Mathews

(10) Patent No.: US 8,805,352 B2
(45) Date of Patent: *Aug. 12, 2014

(54) DETERMINING VIRTUAL LOCATION BASED UPON SCANNED WIRELESS SIGNALS

(71) Applicant: Newaer Inc., Los Angeles, CA (US)

(72) Inventor: David K Mathews, Malibu, CA (US)

(73) Assignee: Newaer Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/756,434

(22) Filed: Jan. 31, 2013

(65) Prior Publication Data

US 2013/0190018 A1  Jul. 25, 2013

Related U.S. Application Data

(63) Continuation-in-part of application No. 13/464,442, filed on May 4, 2012.

(60) Provisional application No. 61/544,370, filed on Oct. 7, 2011, provisional application No. 61/592,776, filed on Jan. 31, 2012.

(51) Int. Cl.
*H04M 3/00* (2006.01)

(52) U.S. Cl.
USPC ......... 455/418; 455/443; 455/507; 455/456.1

(58) Field of Classification Search
USPC ................ 455/418, 443, 507, 456.1
See application file for complete search history.

(56) References Cited

U.S. PATENT DOCUMENTS

| 2008/0022115 | A1* | 1/2008 | Mock et al. ................... 713/178 |
| 2010/0240343 | A1 | 9/2010 | Russell |
| 2011/0269479 | A1* | 11/2011 | Ledlie ......................... 455/456.1 |
| 2011/0306354 | A1* | 12/2011 | Ledlie et al. ............... 455/456.1 |
| 2012/0033658 | A1 | 2/2012 | Ganesan |
| 2012/0072106 | A1* | 3/2012 | Han et al. ...................... 701/410 |
| 2012/0134282 | A1* | 5/2012 | Tirronen et al. ............. 370/252 |
| 2012/0146761 | A1* | 6/2012 | de Clerq et al. ............... 340/4.3 |
| 2012/0172027 | A1* | 7/2012 | Partheesh et al. ............ 455/420 |

* cited by examiner

*Primary Examiner* — Barry Taylor
(74) *Attorney, Agent, or Firm* — Howison & Arnott, LLP

(57) ABSTRACT

A method for determining proximity of two or more mobile units within a defined locale is disclosed. Each of the mobile units is operable to scan at least a portion of the locale associated with the scanning one of the mobile units. The presence of the ones of the plurality of wireless devices is detected within the associated portion of the locale, detecting receiving the unique information from the detected ones of the plurality of wireless devices or device IDs. The received information is formed into a wireless fingerprint and transmitted to a server, which has a database of stored wireless fingerprints that are compared to the received fingerprint and a determination made as to the stored wireless fingerprints within the locale. The relative proximity position of the mobile devices associated with stored wireless fingerprints within the locale is then determined and are transmitted to the scanning one thereof.

11 Claims, 20 Drawing Sheets

| MAC ADDRESS | TIME | GPS LOCATION | SIGNAL STRENGTH | MOBILE UNIT ID | FINGERPRINT GROUP |
|---|---|---|---|---|---|
| A | | | | | |
| B | | | | | |
| C | | | | | |
| D | | | | | |
| E | | | | | |
| F | | | | | |
| G | | | | | |
| H | | | | | |
| I | | | | | |
| J | | | | | |
| K | | | | | |
| L | | | | | |
| M | | | | | |

FIG. 5

DETERMINING VIRTUAL LOCATION BASED UPON SCANNED WIRELESS SIGNALS

CROSS-REFERENCE TO RELATED APPLICATIONS

This application is a continuation of U.S. patent application Ser. No. 13/464,442, filed May 4, 2012, entitled AUTOMATING ACTIONS WITH A PHONE NETWORK BASED UPON SCANNED WIRELESS SIGNALS which claims benefit of U.S. Provisional Application No. 61/544,370, filed Oct. 7, 2011, entitled AUTOMATING ACTIONS WITH A PHONE NETWORK BASED UPON SCANNED WIRELESS SIGNALS. This application also claims benefit of U.S. Provisional Application No. 61/592,776, filed Jan. 31, 2012, entitled DETERMINING VIRTUAL LOCATION BASED UPON SCANNED WIRELESS SIGNALS, the specification of which is incorporated herein in its entirety.

This application is related to co-pending U.S. patent application Ser. No. 13/756,429, filed on even date herewith entitled AUTOMATING ACTIONS WITHIN A PHONE NETWORK BASED UPON SCANNED WIRELESS SIGNALS.

TECHNICAL FIELD

The following disclosure relates to creating approximate derived proximity of device location information within a space based upon scanning for the presence of wireless signals or device IDs, creating a wireless fingerprint of the scanned wireless signals or IDs, matching the scanned wireless fingerprint to at least a portion of a stored wireless or device ID fingerprint, and building a derived location based upon matching the scanned wireless fingerprint or portion thereof to the stored wireless fingerprint.

BACKGROUND

Systems exist for allowing a mobile handset to use GPS signals as a filter to present data within an application to a user. This "location based service" data can be used to show weather forecasts, nearby restaurants or allow a user to check-in to an establishment on social services like foursquare or Facebook. The mobile device can also add GPS data to photographs within the "EXIF" meta data field in order to add location information to photographs to show where a picture was taken. In addition, systems exist for fixed location based actions in which the location of a mobile telephone is determined by GPS location. For "geofencing" a user could user a computer with a web browser to create a pre-determined static "ring" or "box" around an area using a mouse and set up alarms for a mobile telephone leaving that area. These areas could be a home, school, or other area that a parent deems safe. When a mobile phone leaves this area, a trigger initiated via a poll of the GPS on the device could trigger an alert like an SMS message or call within the cellular network. Each of these systems requires a GPS signal to be present and received by the mobile handset in order for the filter, meta data or action to take place. This typically requires a clear view of the sky in order for the mobile device to receive the GPS signal. When a mobile device is used indoors, where the GPS signal cannot be received, the specificity of the location cannot be derived.

SUMMARY

In one aspect thereof, a method for determining proximity of two or more mobile units within a defined locale, the locale having a plurality of wireless devices disposed therein, each having the capability of broadcasting unique information over a broadcast channel, includes each of the two or more mobile units operable to scan at least a portion of the locale associated with the scanning one of the two or more mobile units. The presence of the ones of the plurality of wireless devices are detected within the associated at least portion of the locale, the step of detecting receiving and accumulating the unique information from the detected ones of the plurality of wireless devices. The received unique information is formed into a wireless fingerprint and transmitted to a server. The server has a database of stored wireless fingerprints that are compared to the received fingerprint and a determination made as to the stored wireless fingerprints that are within the locale. The relative position of the mobile devices associated with stored wireless fingerprints within the locale are then determined. The relative positions of the other of the two or more mobile units are transmitted to the scanning one thereof.

BRIEF DESCRIPTION OF THE DRAWINGS

For a more complete understanding, reference is now made to the following description taken in conjunction with the accompanying Drawings in which:

FIG. 5 illustrates an embodiment of a database within the server for storing wireless fingerprints;

DETAILED DESCRIPTION

Figure 1:
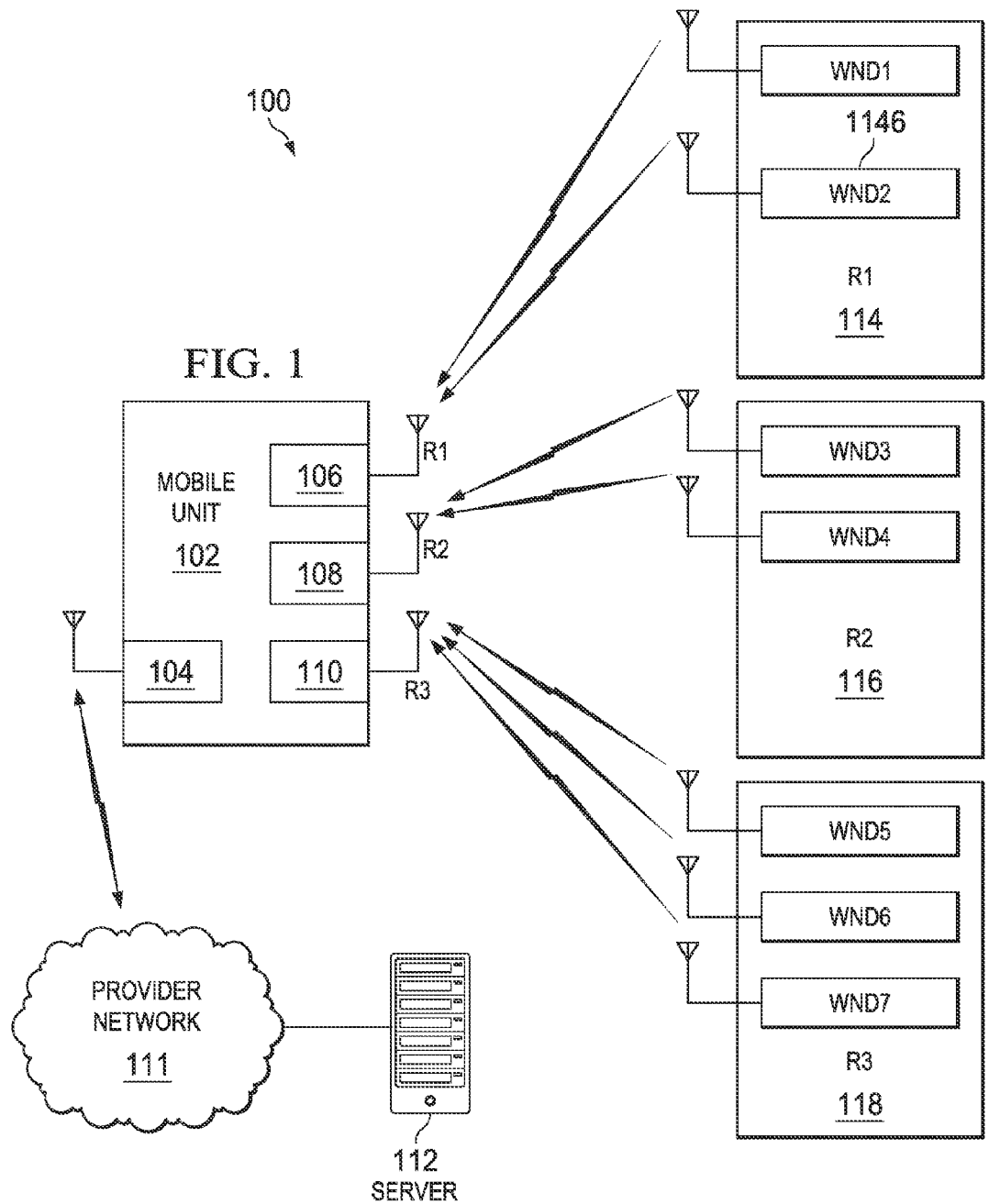
FIG. 1 illustrates an embodiment of a system for automating actions based upon scanned wireless signals in the proximity of a mobile unit.

FIG. 1 illustrates an embodiment of a system 100 for automating actions based upon the presence of scanned wireless signals in the proximity of a mobile unit. In various embodiments, the system 100 provides a platform for automating actions within a mobile unit such as a mobile phone or within a network based upon the presence or lack thereof of detected wireless signals by the mobile unit. The system 100 includes a mobile unit 102 having the capability to receive one or more types of wireless signals transmitted by wireless network devices or other wireless sources. In various embodiments, the mobile unit 102 may include a cell phone, a smart phone, a PDA, a tablet device, or any other type of mobile communication device. In the particular embodiment illustrated in FIG. 1, the mobile unit 102 includes a cellular transceiver 104, a Bluetooth transceiver 106, a Wi-Fi transceiver 108, and a near field communication (NFC) or radio-frequency identification (RFID) transceiver 110. The cellular transceiver 104 includes the capability to receive cellular signals transmitted by a provider network 111. In particular embodiments, the cellular signals may include one or more of CDMA, GSM, LTE, or any other cellular transmission technology. The Bluetooth transceiver 106 includes the capability to receive signals transmitted using Bluetooth technology such as that specified by the IEEE standard 802.15.1 in the 2.4 GHz frequency spectrum. The Wi-Fi transceiver 108 is configured to receive signals transmitted by wireless network devices using Wi-Fi technology such as that specified in various IEEE 802.11 standards. The near field communication (NFC) transceiver 110 is configured to receive signals transmitted by wireless network devices using near field communication technologies such as those specified by ISO Standard 13157 using the 13.56 MHz frequency spectrum or RFID signals using technologies such as those specified by ISO/IEC 14443, ISO 14223, ISO/IEC 15693, ISO/IEC 18000, ISO/IEC 18092, ISO 18185, or ISO/IEC 21481 standards. Near field communication (NFC) allows for simplified transactions, data exchange and wireless connections between two devices in close proximity to one another, usually by no more than a few centimeters. Also, 802.15.xx can be included. In another embodiment, RFID technologies may have the same capabilities and characteristics as that of NFC technologies.

The system 100 includes a server 112 in communication with the provider network 111. The server 112 includes a database for storing various wireless fingerprints as will be further described herein. The system 100 further includes a plurality of Bluetooth wireless network devices 114, a plurality of Wi-Fi wireless network devices 116, and a plurality of NFC or RFID wireless network devices 118. The system 100 may further include a plurality of cellular towers. The Bluetooth wireless network devices 114 include a first Bluetooth wireless network device WND1 and a second Bluetooth wireless network device WND2. The Bluetooth wireless network devices may include any wireless network device capable of transmitting a Bluetooth signal including a laptop computer, a cell phone, a smart phone, a television or set-top box equipment, a Bluetooth equipped automobile or a Bluetooth headset. Bluetooth signals transmitted by each of the Bluetooth wireless network devices 114 are received by the Bluetooth transceiver 106 of the mobile unit 102. The Wi-Fi wireless network devices 116 include a first Wi-Fi wireless network device WND3 and a second Wi-Fi wireless network device WND4. The Wi-Fi wireless network devices 116 transmit Wi-Fi signals which are received by the Wi-Fi transceiver 108 of the mobile unit 102. The Wi-Fi wireless network devices 116 may include a mobile device having Wi-Fi capability, a router, a wireless access point, or any other source of Wi-Fi signals. The NFC wireless network devices 118 include a first NFC wireless network device WND5, a second NFC wireless network device WND6, and a third NFC wireless network device WND7. The NFC wireless network devices 118 are configured to transmit NFC or RFID wireless signals.

In an exemplary operation of the system 100, the mobile unit 102 contains a software application or operating system which, when executed, has the capability to cause the mobile unit 102 to scan for the presence of wireless signals received by one or more of the cellular transceiver 104, the Bluetooth transceiver 106, the Wi-Fi transceiver 108, and a near field communication (NFC) or RFID transceiver 110. In a particular embodiment, the software application may be previously downloaded by a user to the mobile unit 102 from an application store, application marketplace, or a website. Upon detecting the one or more wireless signals, the mobile unit 102 obtains identifying information from each of the wireless signals. In particular embodiments, the mobile unit 102 obtains a media access control (MAC) address or other identifier from the detected wireless signal. The MAC address uniquely identifies the wireless network device that transmits a particular wireless signal. For example, the MAC address may be associated with a Wi-Fi device, a Bluetooth device, an NFC or RFID device, a cellular device or a cellular tower. In still other embodiments, the mobile unit 102 may further determine signal strength of each of the received signals, the time of reception of the signal by the mobile unit 102, and the location of the mobile unit 102 when the signal was received, such as by using GPS signals or cellular triangulation. An advantage offered by the system 100 is that the mobile unit 102 does not have to actually establish a connection with a particular wireless network device in order to obtain the identifying information; it merely has to detect and receive a signal transmitted by such a wireless network device. In other embodiments, both a MAC address and user ID (UID) or an obfuscated hash variant may be used to identify a wireless signal. For example, some devices such as iPhones do not allow access to the MAC address of a device from another iPhone, but they do reveal a portion of their device ID with is a hash of the serial number and the software ID. This may be unique on a software-by-software basis, so that one phone may have one ID for one application, and another unique ID for another application.

Upon scanning the wireless signals transmitted from one or more wireless network devices by the mobile unit 102, the mobile unit 102 collects identifying information from each of the wireless signals and transmits the identifying information such as the MAC address, signal strength, time, location and any other parameters to server 112 via the provider network 111. The server 112 then performs one or more heuristic algorithms on the collected information to determine a wireless fingerprint associated with the current location of the mobile unit 102. The wireless fingerprint is determined based upon the identifying information associated with one or more of the wireless signals obtained during the scanning operation of the mobile unit 102. If the particular wireless fingerprint has not previously been registered with the server 112, the user of the mobile unit 102 may be prompted to designate the wireless fingerprint as associated with the present location of the mobile units 102. If the server 112 recognizes the wireless fingerprint as previously being registered, the server 112 sends an indication to either the mobile unit 102 or another network device to perform an action associated with that particular wireless fingerprint. In one embodiment, the designated action may be an action that is to be performed by the mobile unit 102. In still other embodiments, the designated action may be an action performed by a network device, such as a switch, of the provider network 111. For example, an action which may be associated with the mobile unit 102 includes vibration of the mobile unit 102, showing the location of an item on a map, displaying a video on the mobile unit 102, or displaying an advertisement on the mobile unit 102 upon detection of a particular wireless fingerprint.

In another example, recognition of a particular wireless fingerprint may cause the provider network 111 to change call routing or initiate a call via a switch. For example, a user may designate a scan of the environment of an office for wireless signals and designate that location as the user's office using the mobile unit 102. The server 112 determines a wireless fingerprint associated with the office location from the identifying information of the wireless signals and the user may designate that, upon detection of the wireless fingerprint associated with the office location, calls addressed to the mobile unit 102 should be routed to a telephone within the office instead. In still another example, the recognition of a particular wireless fingerprint may cause a network device such as a television, router, or set-top box to perform a specific action upon detection of the mobile unit 102 being in the presence of the location associated with the wireless fingerprint. In a particular example, music may be streamed from the mobile unit 102 to the network device upon detection of a particular wireless fingerprint.

Although various embodiments may describe a wireless fingerprint as being associated with a "location" it should be understood that a wireless fingerprint may not necessarily be associated with a static location. For example, a user may associate a wireless Bluetooth signal associated with a friend's mobile telephone to an action of vibrating the mobile unit 102. Upon the detection of the wireless fingerprint associated with the friend's mobile telephone by the mobile unit 102, such as when the friend arrives at the same party as the user, the mobile unit 102 may automatically vibrate or send a network command to a social networking Internet service to indicate to the user that the friend has arrived.

Although it is described in various embodiments that the server 112 performs various actions such as recognizing a wireless fingerprint and determining a fingerprint print from detected signals, it should be understood that in other embodiments, recognition of a fingerprint and/or determining of a fingerprint may be performed by other devices such as by the mobile unit 102. Furthermore additional network devices such as cellular networks or networking equipment on an internal wireless infrastructure (WLAN) could contain the recognition software as well. In other embodiment, a Wi-Fi router contains the detection software and performs the rules-based database lookup. In still other embodiments, a cellular tower contains the detection software and performs the rules-based database lookup.

Figure 2:
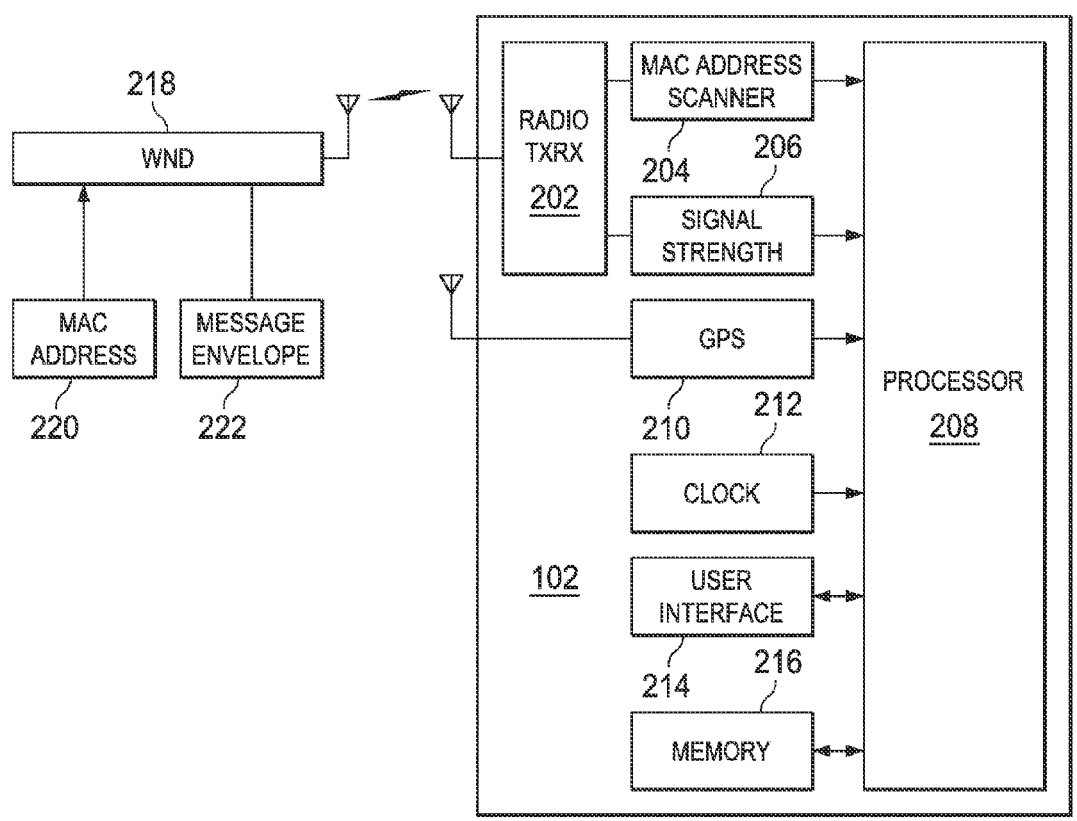
FIG. 2 illustrates an embodiment of a mobile unit and a wireless network device.

FIG. 2 illustrates an embodiment of a mobile unit 102 and a wireless network device 218. The mobile unit 102 includes a radio transceiver 202 configured to receive one or more wireless signals within the environment of the mobile unit 102. Although in the particular embodiment illustrated in FIG. 2, the wireless mobile unit 102 includes a single radio transceiver 202, it should be understood that the mobile unit 102 may include a number of different radio receivers each configured to receive a different type of wireless signal such as cellular, Wi-Fi, Bluetooth, and NFC, as previously described. The mobile unit 102 further includes a MAC address scanner module 104 coupled to the radio transceiver 202 and configured to determine a MAC address associated with a particular wireless signal received by the radio transceiver 202. The mobile unit 102 further includes a signal strength module 206 coupled to the radio transceiver 202 and configured to determine a signal strength associated with the received wireless signal. The MAC address scanner module 204 and the signal strength module 206 are further coupled to a processor 208 to provide the MAC address and signal strength to the processor 208. The mobile unit 102 includes a GPS module 210 configured to receive a GPS signal and provide the GPS signal to the processor 208 in order to determine a location associated with the mobile unit 102. In still other embodiments, the mobile unit 102 may determine its location via cellular triangulation or any other method for location determination. The mobile unit 102 further includes a clock module 212 coupled to the processor 208 and configured to provide a time associated with the reception of a signal to the processor 208. The mobile unit 102 includes a user interface 214 coupled to the processor 208 to allow a user to provide user inputs to the processor 208 as well as allow the processor 208 to provide outputs to the user. For example, in a particular embodiment, the user interface may include a touch screen or keypad to provide input to the mobile unit 102, and a display screen to provide output to the user. A mobile unit 102 further includes a memory 216 coupled to the processor configured to store the scanning application, identifying information associated with received wireless signals such as MAC addresses or an obfuscated hash variant and signal strengths, locations and times, as well as store other data required by the mobile unit 102 during operation.

The wireless network device 218 has a MAC address 220 uniquely associated with the wireless network device 218 and a message envelope 222. The wireless network device 218 transmits a wireless signal within a message envelope 222 which includes the MAC address 220. The radio transceiver 202 of the mobile unit 102 receives the wireless signal transmitted from the wireless network device 218, extracts the MAC address associated with the wireless signal and determines a signal strength associated with the wireless signal. The mobile unit 102 may further determine a GPS location and time of receipt associated with the received wireless signal from the GPS module 210 and clock module 212, respectively. The mobile unit 102 then transmits the identifying information associated with the wireless signals received from the wireless network device 218 to the server 112 via the radio transceiver 202.

Figure 3:
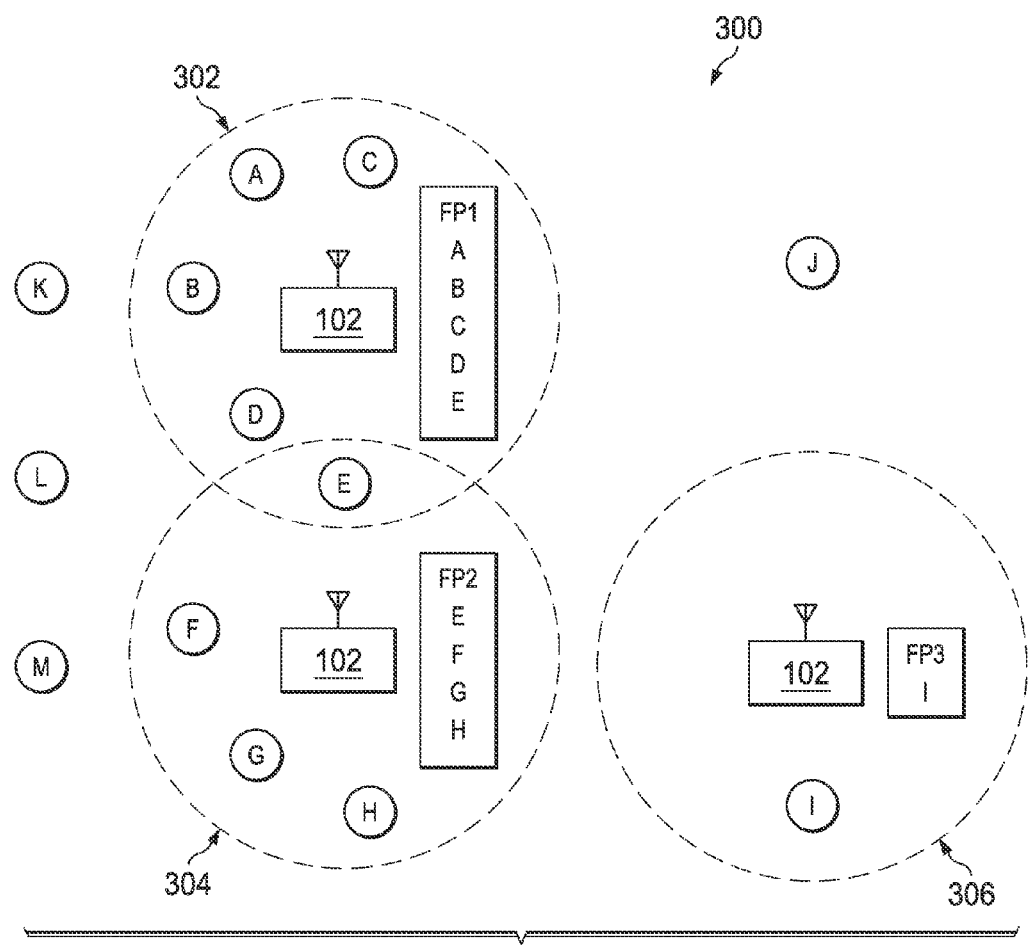
FIG. 3 illustrates an exemplary environment in which the mobile unit operates within different locations in which each location has a different wireless fingerprint associated therewith.

FIG. 3 illustrates an exemplary environment 300 in which the mobile unit 102 operates within different locations in which each location has a different wireless fingerprint associated therewith. In the embodiment illustrated in FIG. 3, the mobile unit 102 is illustrated as being in three different locations as will be further described. The environment 300 includes a number of wireless network devices (WNDs) A-M. In a first location of the mobile unit 102, the mobile unit 102 possesses a reception range 302 in which the mobile unit 102 is able to receive wireless signals from wireless network devices A, B, C, D, E. From the wireless signals transmitted by each of wireless network devices (WNDs) A-E, a first wireless fingerprint FP1 is obtained consisting identifying information from respective wireless signals transmitted by wireless network devices A, B, C, D and E. Although for simplicity the embodiment illustrated in FIG. 3 is shown as using identifiers associated with each of the wireless network devices as a fingerprint, it should be understood that the actual fingerprint may include a MAC address or an obfuscated hash variant, signal strength, time, and location of each of the wireless signals as well as other identifying information. In a second location, the mobile unit 102 has a reception area 304 which encompasses the wireless signals emitted by a wireless network device E, F, G, and H. The resulting second fingerprint FP2 includes the wireless signals transmitted from wireless network devices E, F, G, and H. In a third location, the mobile unit 102 has a reception area 304 which encompasses the wireless signal from only a single wireless network device I. The resulting third wireless fingerprint FP3 includes the wireless signal transmitted by wireless network device I. In the embodiment illustrated in FIG. 3, wireless network devices J, K, L and M sources represent wireless signals which are not received by the mobile unit 102 while the mobile unit 102 is within any of the three locations of the environment 300.

Figure 4:
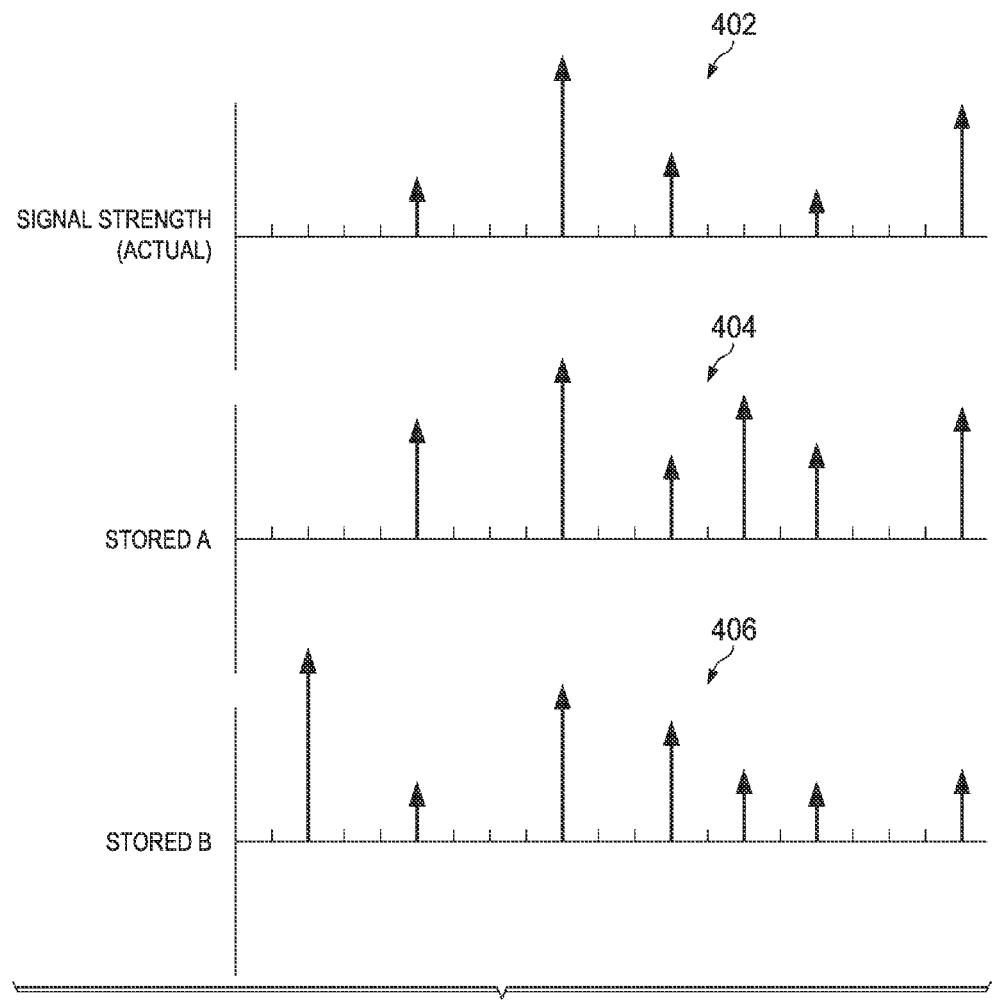
FIG. 4 illustrates an example of an actual measured signal strength of wireless network signals by the mobile unit and two stored wireless fingerprints.

FIG. 4 illustrates an example of an actual measured signal strength of wireless network signals by the mobile unit 102 and two stored wireless fingerprints. In FIG. 4, an actual measured signal strength of wireless signals received by a mobile unit 102 at a particular location is shown in 402. A stored wireless fingerprint stored A is illustrated by 404, and a stored wireless fingerprint stored B illustrated by 406. The wireless fingerprint stored A (404) and wireless fingerprint stored B (406) are stored within the database of the server 112.

The actual measured signals 402 are compared against the stored fingerprints stored A and stored B by the server 112 to determine whether the actual measured signals are an acceptable match to a stored wireless fingerprint. In various embodiments, the server may use heuristics to determine whether the actual measured signals 402 match a stored fingerprint stored A (404) or stored B (406). As cam be seen in FIG. 4, none of the stored fingerprints (404, 406) are an exact match of the actual measure wireless signals 402. Signal strengths of the actual signals 402 differ from those of the stored fingerprints 404 and 406. In addition, the stored fingerprints 404 and 406 contain signals that are not present in the actual measured signals 402. In a particular embodiment, the server 112 may determine that fingerprint stored A 404 is the closest match to the actual measured signals 402 and that it matches fingerprint stored A 404 to an acceptable level. As a result, the server 112 will send an indication, for example to the mobile unit 102, to perform an action associated with fingerprint stored A (404).

FIG. 5 illustrates an embodiment of a database 500 within the server 112 for storing wireless fingerprints. The database 500 contains fields associated with each of the wireless signals detected by the mobile unit 102 which are used in determining a particular wireless fingerprint. The database 500 includes a MAC address field or an obfuscated hash variant 502, a time field 504, a GPS location field 506, a signal strength field 508, a mobile unit ID field 510 and a fingerprint group 512. The MAC or an obfuscated hash variant address field 502 includes an address associated with a particular wireless signal, the time field includes the time of reception of a particular wireless signal, the GPS location field 506 includes a GPS location of the mobile unit 102 at the time of the reception of a particular wireless signal, and a signal strength field 508 includes a measured signal strength of a particular wireless signal. The mobile unit ID field 510 includes a mobile unit ID associated with the mobile unit 102, and the fingerprint group field 512 contains an indication of a particular fingerprint to which the detected wireless signal belongs.

Figure 6:
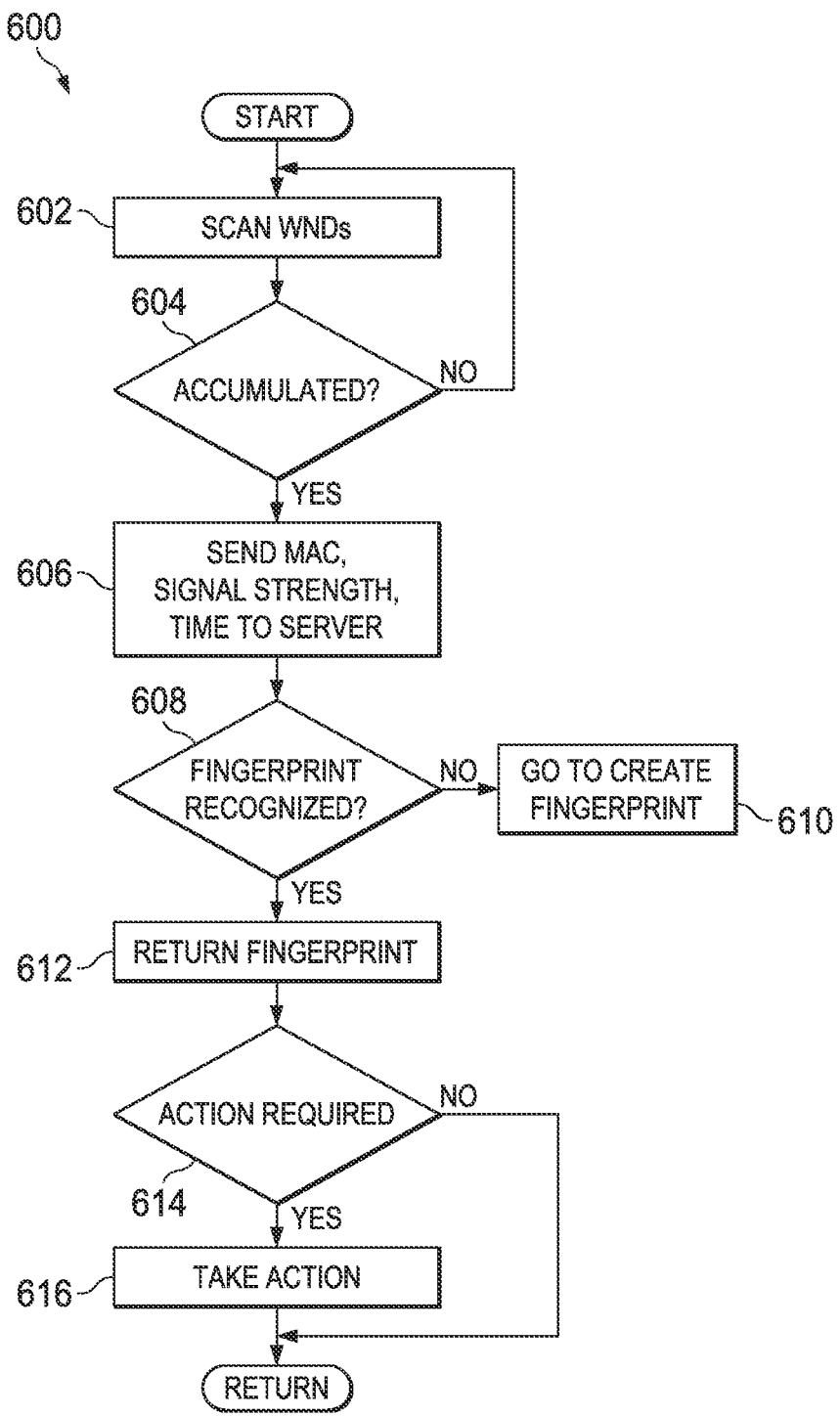
FIG. 6 illustrates an embodiment of a procedure for a executing a scanning procedure of the mobile unit.

FIG. 6 illustrates an embodiment of a procedure 600 for a executing a scanning procedure of the mobile unit 102. In various embodiments, the scanning procedure is performed by a software application executed by the mobile unit 102. In step 602, the mobile unit 102 scans the frequency spectrums receivable by the mobile unit 102 for the presence of wireless network device signals and determines the MAC address, signal strength, and time of reception of any wireless signal received from a wireless network device. In step 604 it is determined whether all of the receivable wireless signals have been accumulated. If not all of the receivable wireless signals have been accumulated the procedure returns to step 602 in which scanning is continued. If all the receivable wireless network signals have been accumulated the procedure continues to step 606 in which the MAC address or an obfuscated hash variant, signal strength and time of reception of each of the detected wireless network signals are sent to the server 112. In some embodiments, the location of the mobile unit 102 during the reception of each of the wireless network signals may also be sent to the server 112. In step 608 it is determined whether a wireless fingerprint represented by the received wireless network signals is recognized by the server 112. The server 112 determines whether the received wireless network signals match a fingerprint in the database of the server 112 using heuristic or any other algorithm. If the wireless fingerprint is not recognized, the procedure continues to step 610 in which a procedure to create a fingerprint associated with the currently received wireless signals is initiated. This procedure will be further described herein with respect to FIG. 8. If the fingerprint is recognized in step 608, a fingerprint identifier is returned in step 612. In step 614 it is determined whether an action is required due to the detection of the wireless fingerprint. If no action is required, the procedure returns to the start. If it is determined in step 612 that an action is required, the required action is taken in step 614 and the procedure returns to the start.

Figure 7:
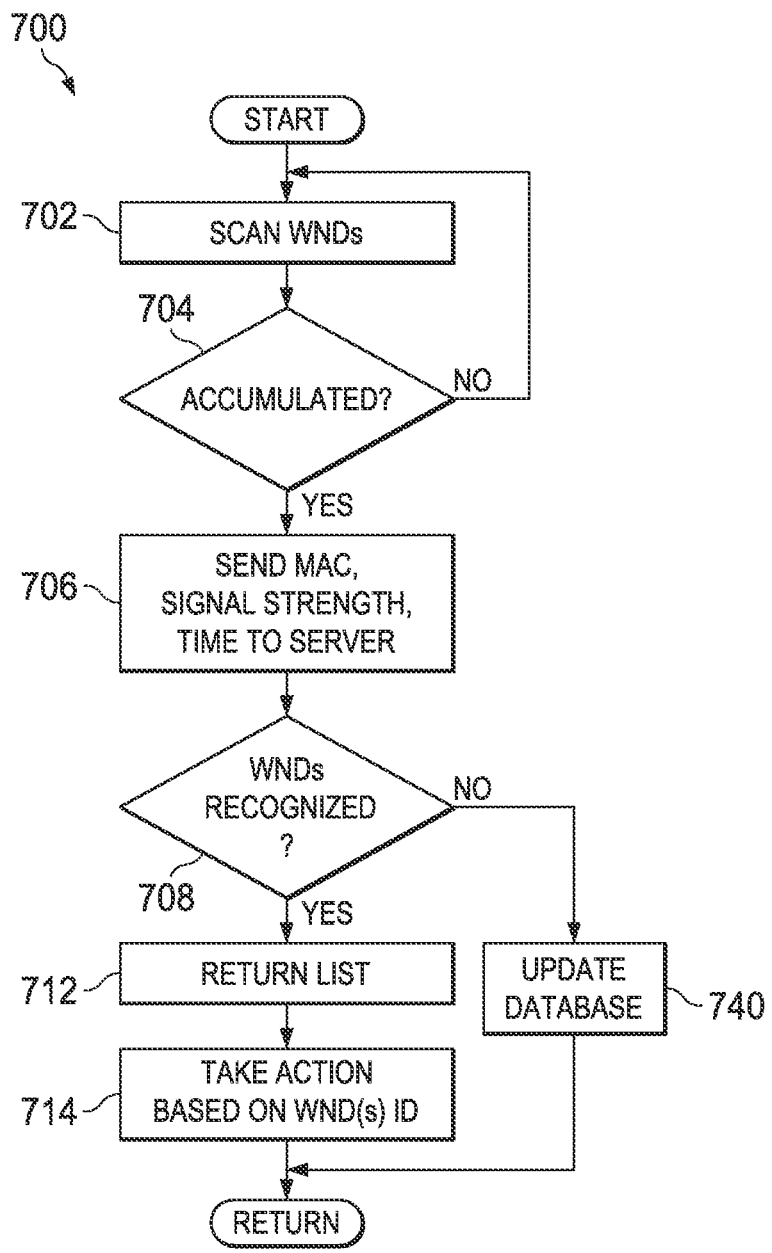
FIG. 7 illustrates an embodiment of a procedure in which the scanning procedure of the mobile unit automatically collects fingerprint data of the environment in which the mobile unit is located.

FIG. 7 illustrates an embodiment of a procedure 700 in which the scanning procedure of the mobile unit 102 automatically collects fingerprint data of the environment in which the mobile unit 102 is located. In step 702, the mobile unit 102 scans for the presence of wireless signals associated with wireless network devices. In step 704 it is determined whether all receivable wireless signals have been accumulated if not, the procedure returns to step 702 in which scanning continues. If all the wireless signals have been accumulated, the procedure continues to step 706 in which the MAC address, signal strength, and times associated with the wireless signals are sent to the server 112. In step 708, the server 112 determines whether the wireless network devices are recognized as being previously detected within the database of the server 112. If the wireless network devices are not recognized, the procedure continues to step 710 in which the database within server 112 is updated to include the identifying information associated with the newly scanned wireless signals. The procedure 700 then returns to start. If all the wireless network devices are recognized in step 708, the procedure continues to step 712 in which a list of the wireless network devices is returned to the mobile unit 102. In step 714 any action associated with a fingerprint represented by the detected wireless network devices is taken, and the procedure 700 then returns to the start.

Figure 8:
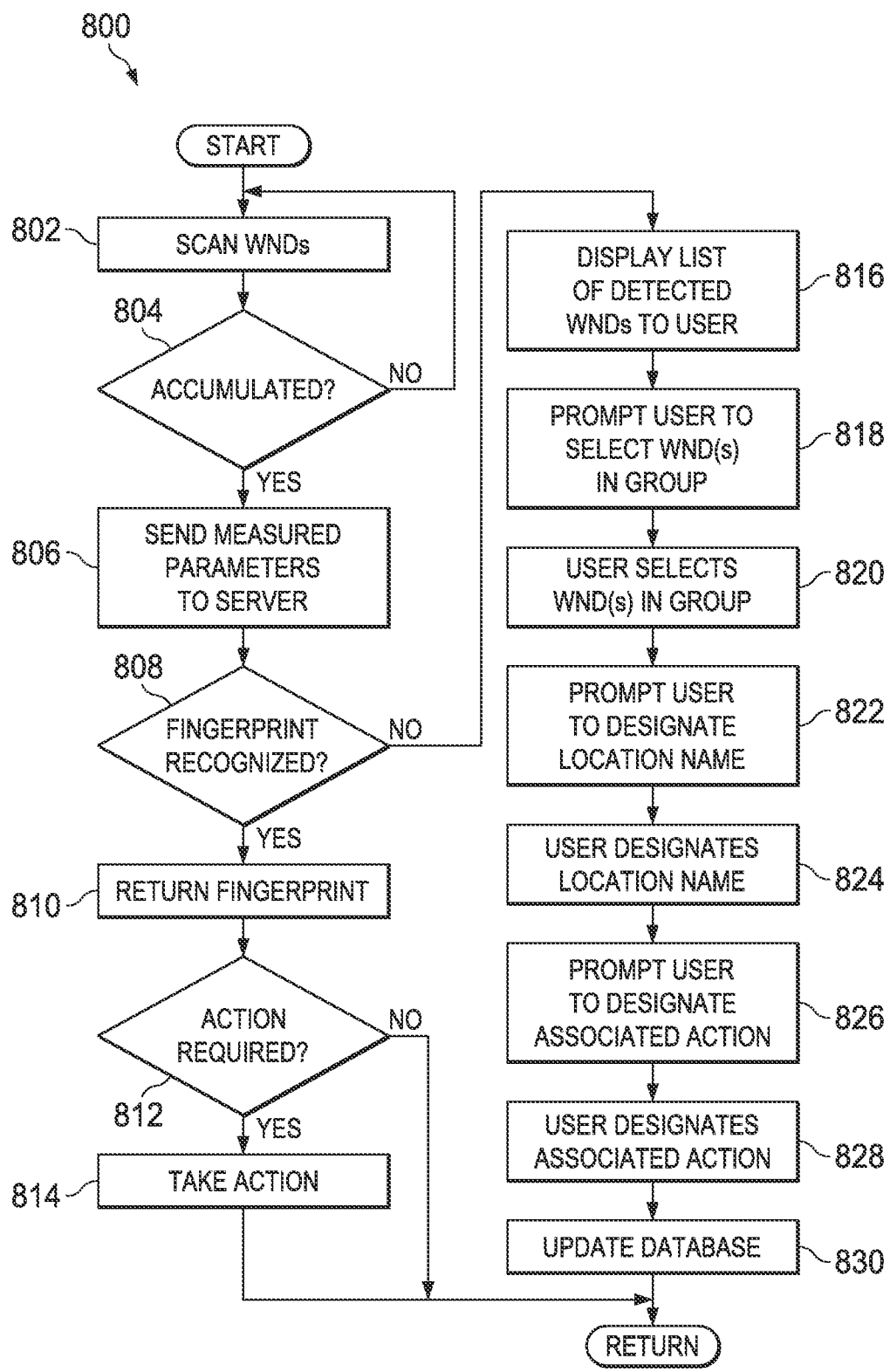
FIG. 8 illustrates an embodiment of a procedure for scanning wireless network devices and associating an action with a wireless fingerprint.

FIG. 8 illustrates an embodiment of a procedure 800 for scanning wireless network devices and associating an action with a wireless fingerprint. In step 802, the mobile unit 102 scans for wireless network devices. In step 804, the mobile unit 102 determines whether all of the available wireless network devices having wireless signals scannable by the mobile unit 102 have been accumulated. If it is determined in step 804 that the scanned wireless network devices have not been accumulated, the procedure returns to step 802 in which the scanning of wireless network devices is continued. If it is determined in step 804 that the scanned wireless network devices have been accumulated, the procedure 800 continues to step 806. In step 806, the mobile unit 102 sends the measured parameters of each of the scanned wireless network device signals to the server 112. The measured parameters may include one or more of the MAC address or an obfuscated hash variant, signal strength, time of reception, and location of the mobile unit 102 of each of the scanned wireless signals from each of the wireless network devices. In step 808, the server 112 determines whether the wireless fingerprint associated with the scanned wireless network devices is recognized by the server 112. If the fingerprint is recognized, the procedure continues to step 810 in which the fingerprint is returned from the database of the server 112. In step 812, it is determined whether an action associated with the fingerprint is required to be performed. In one embodiment, the determination of whether an action is to be performed in association with the recognition of a wireless fingerprint is done by the mobile unit 102. In still other embodiments, the recognition of whether an action is required to be performed by the detection of an associated fingerprint is performed by the server 112 or by a node associated with the provider network 111. If no action is required, the procedure returns to the start. If an action is required the action is taken in step 814. In various embodiments, the action may be performed by one or more of the mobile unit 102, the server 112, or a network node associate with a provider network 111.

If it is determined in step 808 that the fingerprint is not recognized, the procedure continues to step 816 in which a procedure allowing a user to create a fingerprint to be associated with the currently received wireless signals is initiated. In step 816, a list of detected wireless network devices is displayed to the user the mobile unit 102. In step 818, the user is prompted to select one or more of the wireless network devices as a group. In step 820 the user selects the wireless network devices in the group which are to be included in the created wireless fingerprint. In other embodiments, step 820 may be omitted and the designation of which signals are to be included in the created fingerprint is performed automatically by the server 112 or the mobile unit 102. In step 822, the user is prompted to designate a location name to be associated with the selecting group of wireless network devices that are to form the fingerprint. In step 824, the user designates the location name. For example, the user name may designate a location name to be associated with a particular group of selected wireless network devices as a home, office, or the name of a particular restaurant. In step 826, the user is prompted to designate an associated action with the selected group. In a particular embodiment, the user may be presented with a list of available actions from which to choose from. In step 828, the user designates the associated action. Examples of associated actions may include notification by the mobile unit 102 that a wireless fingerprint associated with the selected group has been detected, routing incoming calls to a telephonic device at the designated location upon detection of the wireless fingerprint, or initiating an action within a network device such as streaming music to a set-top box connected to a television upon the mobile unit 102 detecting the wireless fingerprint associated with the location of the set-top box. In still other examples, the designated action to be associated with a particular wireless fingerprint may include the launching of an application on the mobile unit 102 or to steam audio or video to the mobile unit 102 upon detection of the wireless fingerprint. In step 830, the database of the server 112 is updated to include the measured parameters associated with the wireless fingerprint, the location name, and the associated action as well as an identifier associated with the mobile unit 102 or the user of the mobile unit 102. The procedure 800 then returns.

Figure 9:
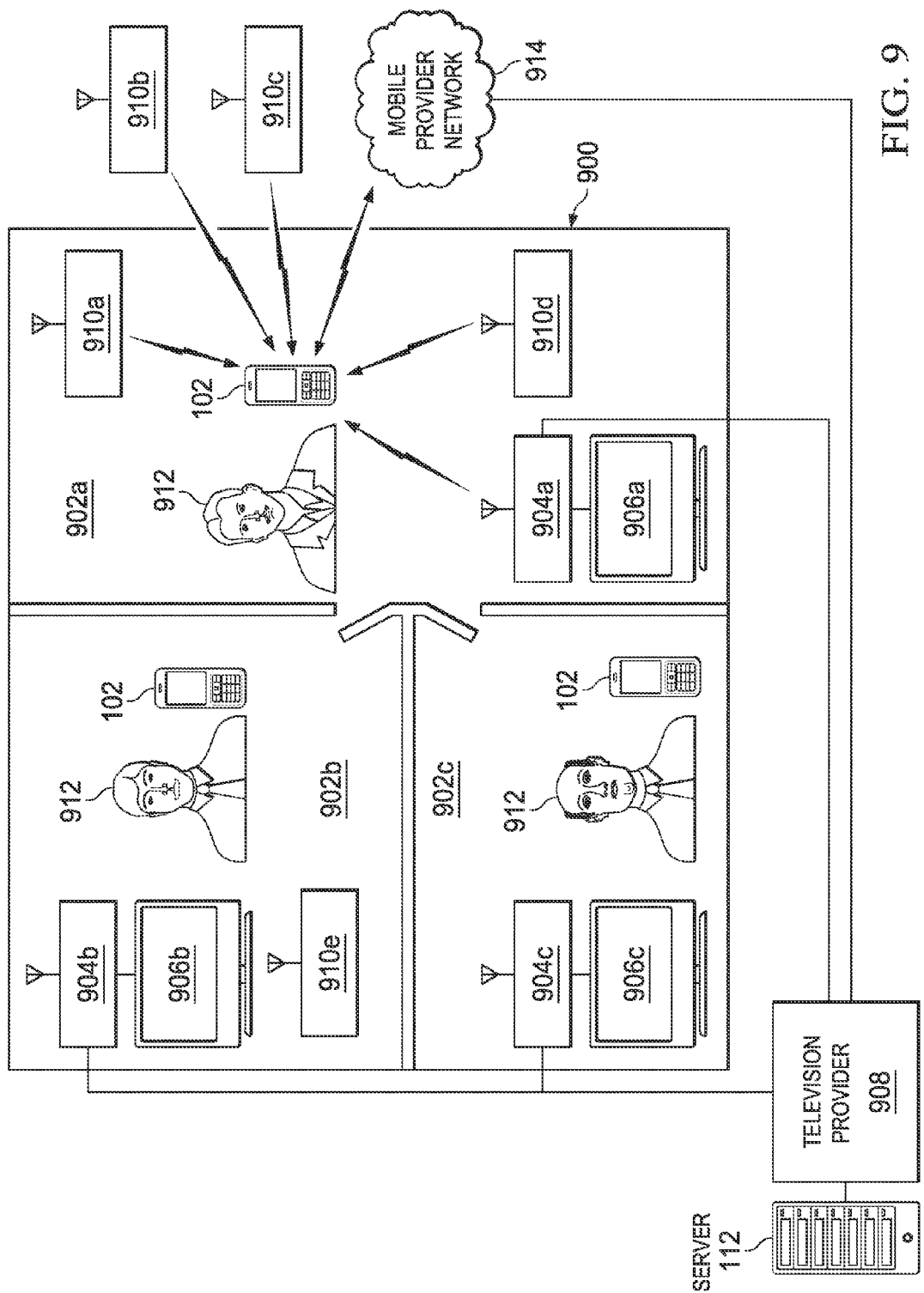
FIG. 9 illustrates an embodiment of a system for use in a residential environment for controlling a set-top box by a mobile unit based upon a detected wireless fingerprint.

FIG. 9 illustrates an embodiment of a system for use in a residential environment for controlling a set-top box by a mobile unit based upon a detected wireless fingerprint. In the embodiment illustrated in FIG. 9, a residential structure 900, such as a home, includes a first location 902A, a second location 902B and a third location 902C. In a particular embodiment, the first location 902A, second location 902B, and third location 902C are separate rooms of a home. The first location 902A has a gateway set-top box 904A connected to a video display device 906A thereat. In a particular embodiment, the first video display device 906A is a television. The second location has a second set-top box 904B connected to a second video display device 906B, and the third location 902C has a third set-top box 904C connected to a third video display device 906C. The gateway set-top box 904A, the second set-top box 904B, and the third set-top box 904C are each connected to a television provider 908 via a network such as a cable, DSL network, or wireless network. The television provider 908 further includes a server 112 incorporated therewith. The server 112 includes a database for storing wireless fingerprints as previously described herein. The residential environment includes a plurality of wireless network device 910A-910E located within an/or external to the residential structure 900. Each of the plurality of wireless network device 910A-910E are configured to transmit wireless signals including a MAC address. In various embodiments, the wireless network devices 910A-910E may include any combination of wireless signal emitter such as Wi-Fi, Bluetooth, NFC and cellular tower signals. A user 912 having a mobile unit 102 in possession may be located in the first location 902A, second location 902B or third location 902C of the residential structure 900 at different times. The mobile unit 102 is configured to communicate with a mobile provider network 914, and the mobile provider network 914 is in communication with the television provider 908. As previously described herein, the mobile unit 102 is configured to scan for the presence of wireless signals from one or more of the wireless network devices 910A-910E and perform an action if a previously registered wireless fingerprint is recognized. In a particular embodiment, the gateway to the top box 904A may include Wi-Fi or Bluetooth capability whereas the second set-top box 904B and the third set-top box 904C may not include wireless capability.

In a particular example, the user 912 stands proximate to the gateway set-top box 904A in the first location 902A and runs an application on the mobile unit 102 which scans for the presence of wireless signals from the various wireless network devices 902A-902E which are currently receivable. The user 912 may then select an identification of the appropriate set-top box, that is gateway set-top box 904A that it is currently proximate to and this data is sent to the television provider 908 via the mobile provider network 914. A server 112 determines a wireless fingerprint and correlates the location of the user 912 with the wireless fingerprint using heuristics. Similarly, the user 912 may stand proximate to each of the second set-top box 904B and the third set-top box 904C and register the mobile unit 102 with each of them respectively by measuring a wireless fingerprint at each of the second location 902B and the third location 902C. Since the receivable signals and signal strengths of the receivable signals will differ at each of the first location 902A, the second location 902B and the third location 902C, each of the first location 902A, second location 902B, and third location 902C will have a different wireless fingerprint associated therewith. Once a mobile unit 102 is registered with a particular set-top box, the mobile unit 102 may be used to control the particular set-top box upon detection of the wireless fingerprint associated with the location of that particular set-top box. Thus, the user 912 is able to move throughout the residential structure 900 and control particular set-top boxes using the mobile unit 102 without requiring the user 912 to designate the particular set-top box that is desired to be controlled.

In a particular example, the mobile unit 102 is configured to host photos using videos or other data. A user then enters the residential structure 900 and the mobile unit 102 executes a software application. The application scans for the wireless fingerprint of the current location within the residential structure 900, determines which set-top boxes are available to present photos, music or other data, and the mobile unit 102 is authenticated with each of these set-top boxes. In a particular embodiment, the user may see an indication of the video display device that the mobile unit 102 has been authenticated with the set-top box. Data on the phone, such as music and videos may be then sent over the mobile provider network 914 to the television provider 908, then sent to and received by a set-top box within the residential structure 900 over the television provider network. In particular embodiments, the audio, video or other presentation may follow the user 912 as it moves to different locations throughout the residential structure 900 so that it is routed to the appropriate set-top box associated with the location in which the user 912 is currently positioned. An advantage of such a system is that media may be presented from a mobile unit 102 on video display devices without requiring the mobile unit 102 to be authenticated on a Wi-Fi or other home network associated with the residential structure 900.

Figure 10:
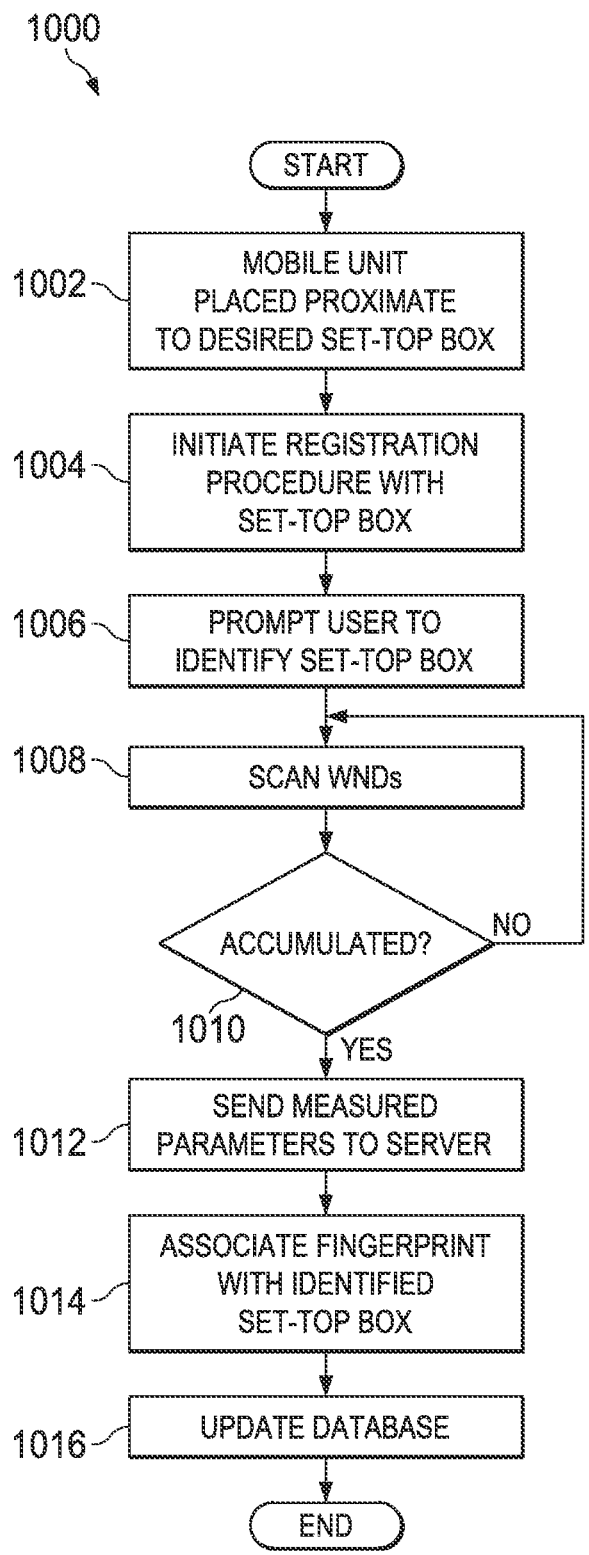
FIG. 10 illustrates an embodiment of a procedure for registering the mobile unit with a set-top box of the residential environment illustrated in FIG. 9.

FIG. 10 illustrates an embodiment of a procedure 1000 for registering the mobile unit 102 with a set-top box of the residential environment illustrated in FIG. 9. In step 1002, the mobile unit 102 is placed proximate to the desired set-top box of which the mobile unit 102 is to be registered. In step 1004, a registration procedure is initiated with a set-top box by the mobile unit 102. In step 1006, the mobile unit 102 prompts the user to identify the set to box to which registration is currently desired. In step 1008, the mobile unit 102 scans for wireless signals from wireless network devices that are receivable by the mobile unit 102. In step 1010, the mobile unit 102 determines whether all wireless network devices that are currently receivable have been accumulated. If not, the procedure 1000 returns to step 1008 in which scanning of wireless network devices is continued. If all wireless network devices have been accumulated, the procedure continues to step 1012 in which the measured parameters associated with the wireless signals received from the wireless network devices is sent to the server 112. Examples of measured parameters include MAC addresses, signal strengths, time of reception, location of the mobile unit 102, as well as an identification of the mobile unit 102 or a user associated with the mobile unit 102.

In step 1014 the server 112 associates the wireless fingerprint generated from the information obtained from the scanned signals from the wireless network devices with the identified set-top box. In step 1016 the database associated with server 112 is updated to include the identifying information associated with the wireless fingerprint.

Figure 11:
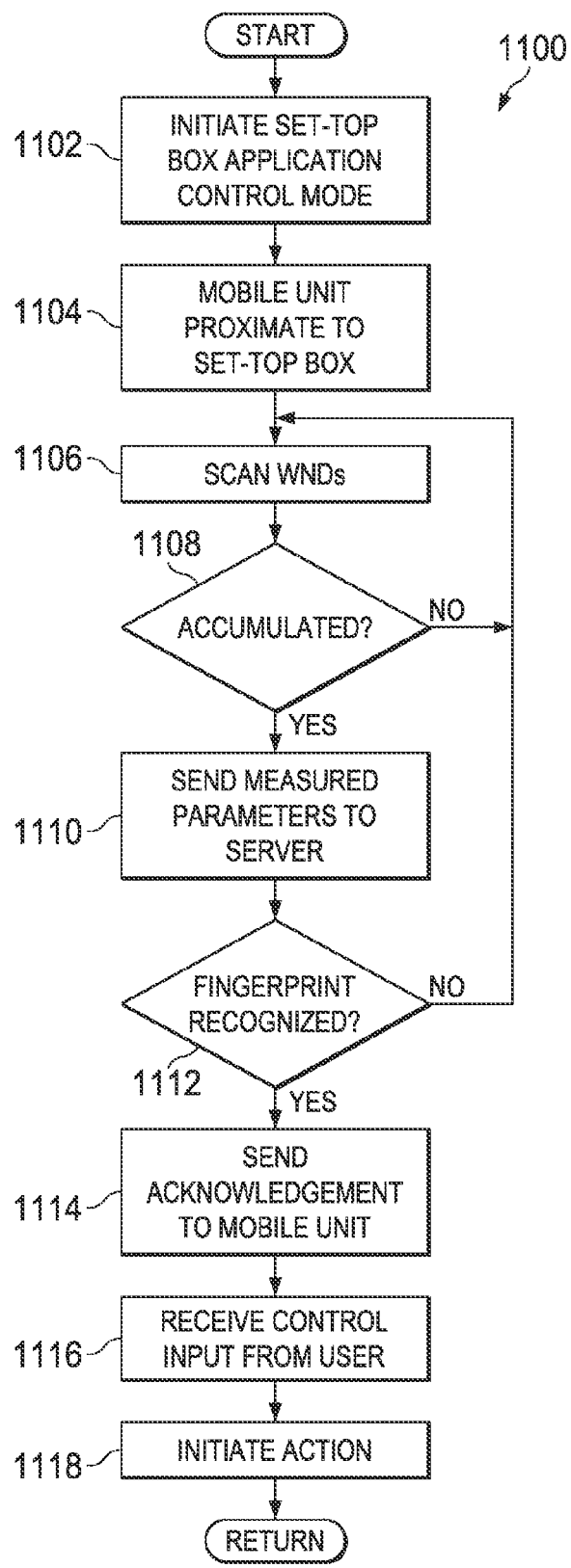
FIG. 11 illustrates an embodiment of a procedure for controlling a registered set-top box using a mobile unit based upon a detected wireless fingerprint.

FIG. 11 illustrates an embodiment of a procedure 1100 for controlling a registered set-top box using a mobile unit 102 based upon a detected wireless fingerprint. In step 1102, the mobile unit 102 initiates a set-top box application control mode of a software application. In one embodiment, the initiation of the set-top box control mode may be performed by a user of the mobile unit 102. In still other embodiments, the initiation of the set-top box application control mode may be formed automatically upon detection of a wireless fingerprint. In step 1104, the mobile unit 102 is placed proximate to the set-top box. In step 1106, the mobile unit 102 scans for wireless signals transmitted by one or more wireless network devices 910a-910e. In step 1108 it is determined whether all of the available wireless signals that are receivable by the mobile unit 102 have been accumulated. If not, the procedure returns to step 1106 in which scanning continues. If the wireless signal have been accumulated, the procedure 1100 continues to step 1110 in which measured parameters associated with each of the received wireless network signals are sent to the server 112. In step 1112, the server 112 determines whether the measured parameters are recognized as matching a wireless fingerprint associated with a registered set-top box. If not, the procedure returns to step 1106 in which scanning continues. If the measured parameters are recognized as matching a wireless fingerprint, the procedure continues to step 1114. In step 1114, the server 112 sends an acknowledgement to the mobile unit 102. In step 1116, the mobile unit 102 receives a control input from a user which includes a command for the set-top box associated with the matched wireless fingerprint to perform a function such as changing a volume, changing a channel, or initiating playback of multimedia. In step 1118, an action is initiated in response to the control input. The procedure then returns to the start.

Figure 12:
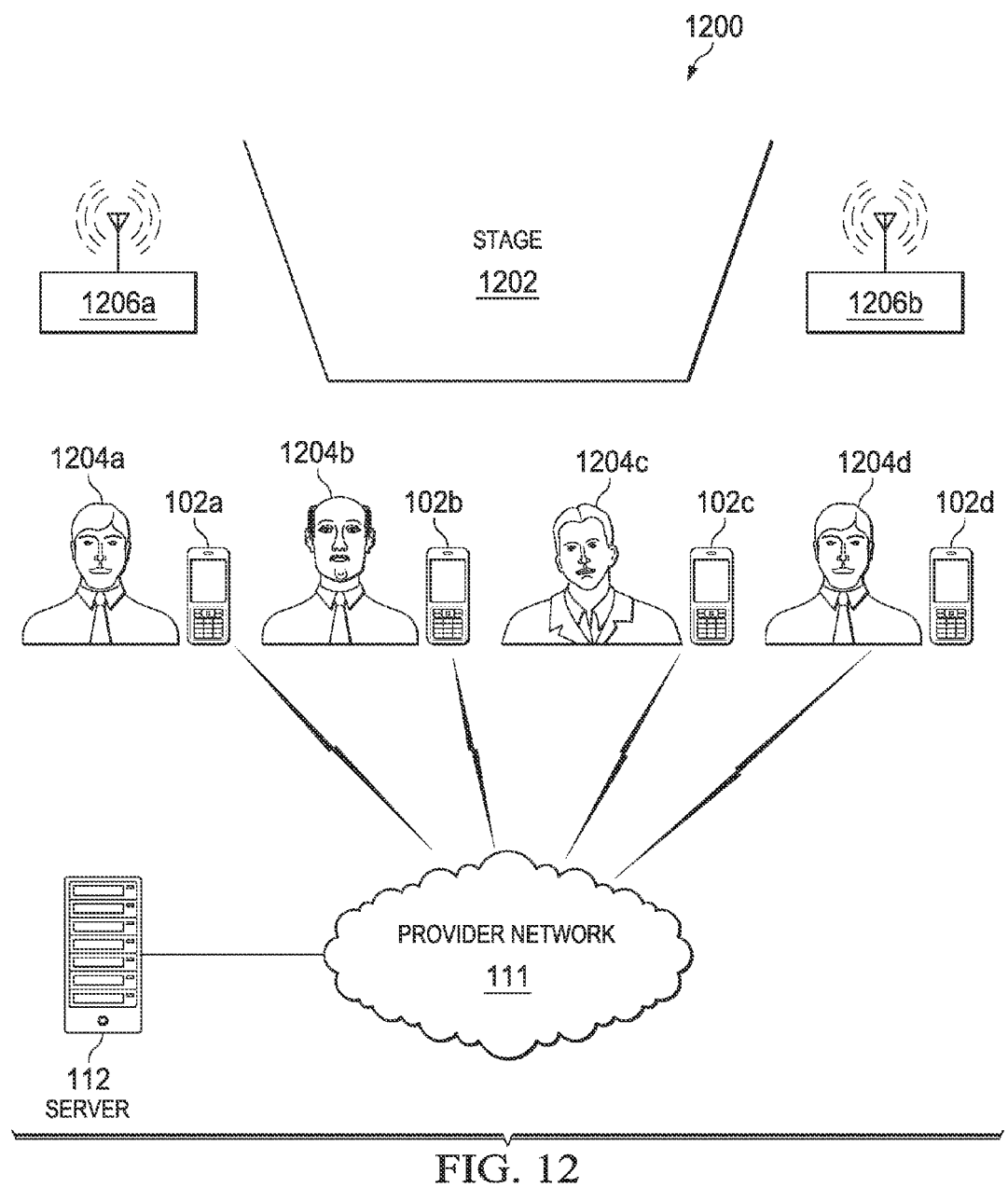
FIG. 12 illustrates an embodiment of a system for determining a relative location of one or more mobile devices based upon scanned wireless fingerprints within an environment.

FIG. 12 illustrates an embodiment of a system for determining a relative location of one or more mobile devices based upon scanned wireless fingerprints within an environment 1200. In the particular embodiment illustrated in FIG. 12, the environment 1200 is a concert event environment having a stage 1202. A number of mobile units 102a-102d, each associated with a respective user 1204a-1204d, are disposed within the environment 1200. The environment 1200 further includes wireless network devices 1206a-1206b each configured to transmit one or more RF signals within the environment. In a particular embodiment, the wireless network devices 1206a-1206b are wireless base stations. In various embodiments, at least one of the wireless network devices 1206a-1206b is fixed at a known location. Each of the mobile units 102a-102d are in communication with a server 112 via a provider network 111. The server 112 includes a database for storing various wireless fingerprints such as the wireless fingerprints previously described herein that have been previously scanned by various devices such as the mobile units 102a-102d. The server 112 further functions to determine a relative proximate location of one or more of the mobile units 102a-102d based upon two or more different wireless fingerprints. In some embodiments, the relative location is the relative location of a mobile unit 102a-102d with respect to a known location. In still other embodiments, the relative location is the location of one of the mobile unit 102a-102d with respect to another of the mobile units 102a-102d.

In operation, one or more of the mobile units 102a-102d scans an area of the environment 1200 for wireless signals receivable by the particular mobile unit 102a-102d at a particular time to capture a wireless fingerprint. The mobile units 102a-102d then send the respective wireless fingerprints to the server 112. Based upon the wireless fingerprints as well as the time of arrival of each of the wireless fingerprints, the server 112 determines the position of one or more of the mobile units 102a-102d in relation to a known fixed point such as the wireless network device 1206a. In a particular example, a mobile unit 102a scans the environment 1200 and detects one or more wireless signals transmitted by wireless devices in the environment. For example, the first mobile unit 102a may scan the environment and detect WiFi signals from the wireless network devices 1206a-1206b, and Bluetooth signals from mobile unit 102b and mobile unit 102c. The mobile unit 102a then sends information regarding device IDs and the signal strength of each of these signals representing a first wireless fingerprint as well as the time of measurement to the server 112. The mobile unit 102d may also scan the environment and detect the Wifi signals from the wireless network devices 1206a-1206b as well as a Bluetooth signal from mobile unit 102c. The mobile unit 102d then sends information regarding device IDs and the signal strength of each of these signals representing a second wireless fingerprint as well as the time of measurement to the server 112. It should be understood that other mobile units 102b and 102c may also send wireless fingerprints to the server 112.

The server 112 then uses overlapping fingerprint information from the first and second fingerprints and the timestamps of each of the first and second wireless fingerprints to determine the location of either of mobile unit 102a or mobile unit 102d relative to the known location of the wireless network device 1206a, or alternately the distance between mobile unit 102a or mobile unit 102d. The server 112 may then send the location information to one or more of mobile unit 102a or mobile unit 102d. Mobile unit 102a or mobile unit 102d may then use the location information to perform some action. For example, the mobile unit 102a may inform the user 1209a that a known friend who is the user 1204d of mobile unit 102d is nearby. In still another embodiment, one or more of the users 1204a-1204d may user their respective mobile units 102a-102d to take pictures or videos during the concert event. Using the locations of each of the mobile units 102a-102d determined by the capturing of wireless fingerprints, the server 112 can determine the location within the environment 1200 that a particular picture or video was taken at a particular time and aggregate a plurality of pictures into a recreation of the concert.

Figure 13:
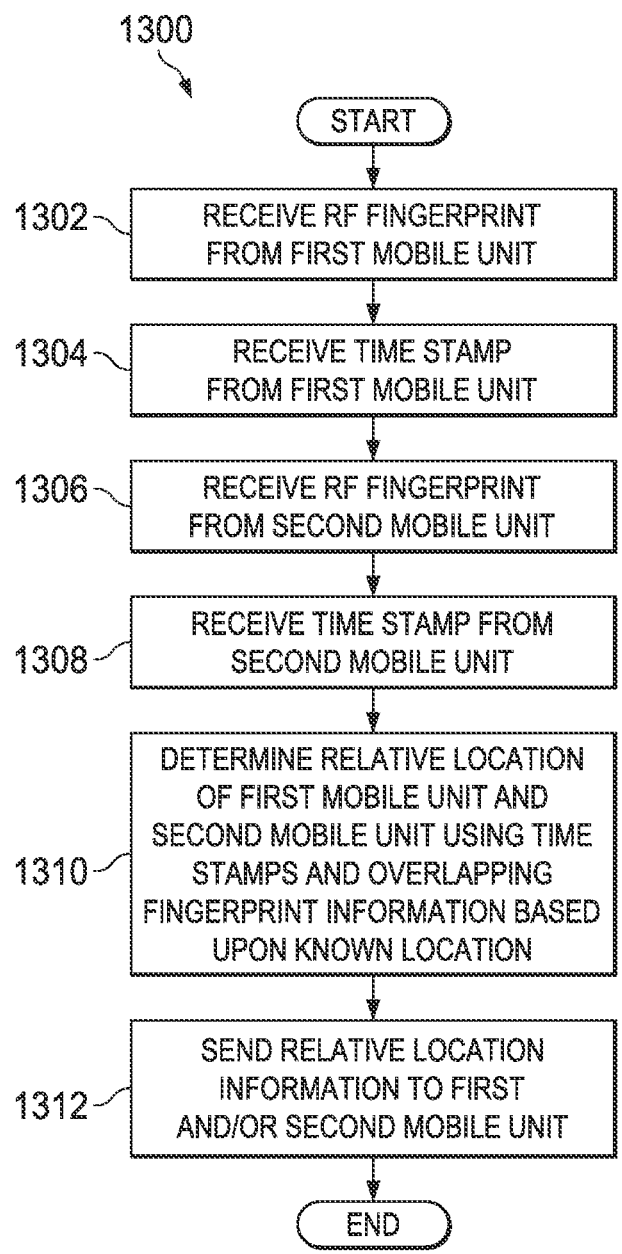
FIG. 13 illustrates an embodiment of a procedure for determining a relative location of a mobile unit by a server.

FIG. 13 illustrates an embodiment of a procedure 1300 for determining a relative proximate location of a mobile unit by a server. In step 1302, the server 112 receives a first wireless RF fingerprint from a first mobile unit 102a. The first mobile unit 102a obtains the wireless fingerprint by scanning for the presence of RF signals or network device IDs from multiple frequency bands in its proximity including cellular, Bluetooth and WiFi frequency bands. In step 1304, the server 112 receives a first time stamp from the first mobile unit 102a indicative of a time at which the first wireless fingerprint was obtained by the first mobile unit 102a. At step 1306, the server 112 receives a second wireless RF signals or network device IDs as a fingerprint from a second mobile unit 102d. The second mobile unit 102d obtains the wireless fingerprint by scanning for the presence of RF signals from multiple frequency bands in its proximity including cellular, Bluetooth and WiFi frequency bands. In step 1308, the server 112 receives a second time stamp from the second mobile unit 102d indicative of a time at which the second wireless fingerprint was obtained by the second mobile unit 102d.

In step 1310, the server 112 determines the relative position of the first mobile unit 102a and/or the second mobile unit 102d using overlapping fingerprint information obtained from the first wireless fingerprint and the second wireless fingerprint as well as the first time stamp and the second time stamp based upon a known location. Using the relative strengths of the common wireless signals obtained by each of the first mobile unit 102a and the second mobile unit 102d forming the first and second wireless fingerprints and the time of reception of such wireless signals, the server 112 can determine a relative location of the first mobile unit 102a and the second mobile unit 102d. This relative location may be the location of the first mobile unit 102a and the second mobile unit 102d with respect to a known location, such as the location of a wireless access point. For example, the first mobile unit 102a and the second mobile unit 102d may each obtain wireless fingerprints which include one or more signals from the wireless network device 1206a in which the wireless network device 1206a has a known location. Since the first mobile unit 102a is closer to the wireless network device 1206a than the second mobile unit 102d, the signal strength of a signal from the wireless network device 1206a is likely to be greater when received by at approximately the same time by the first mobile unit 102a than the second mobile unit 102d. Using this information as well as the signal strengths, identities, and time of reception of other wireless signals that make up a wireless fingerprint, the server 112 may determine the location of the first mobile unit 102a and the second mobile unit 102d relative to the wireless network device 1206a. Accordingly, the distance between the first mobile unit 102a and the second mobile unit 102d may be determined by the server 112.

In step 1312, the server 112 sends the relative location information to the first mobile unit 102a and/or the second mobile unit 102d. The first mobile unit 102a and the second mobile unit 102d may then perform some action based upon this relative location information. For example, as an alternative to the server 112 determining the distance between the first mobile unit 102a and the second mobile unit 102d, the distance between the first mobile unit 102a and the second mobile unit 102d may be determined by the first mobile unit 102a or the second mobile unit 102d. In at least one embodiment, the first mobile unit 102a may alert the user 1209a of the presence of the user 1204d associated with the second mobile unit 102d when the distance between the first mobile unit 102a and the second mobile unit 102d is determined to be within a predetermined threshold distance.

Figure 14:
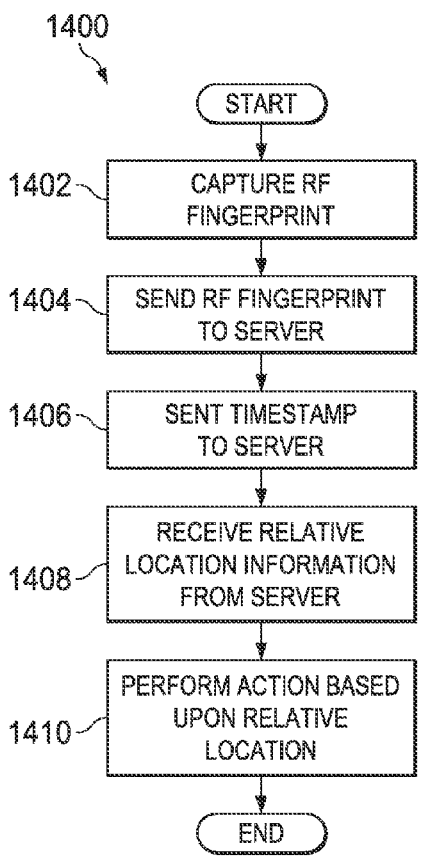
FIG. 14 illustrates an embodiment of a procedure for capturing a wireless fingerprint and performing a predetermined action based upon a determined relative location by a mobile unit.

FIG. 14 illustrates an embodiment of a procedure 1400 for capturing a wireless fingerprint and performing a predetermined action based upon a determined relative location by a mobile unit 102a. In step 1402, the mobile unit 102a captures an RF wireless fingerprint by scanning for the presence of RF signals from multiple frequency bands in its proximity including cellular, Bluetooth and WiFi frequency bands. In step 1404, the mobile unit 102a sends the RF wireless fingerprint to the server 112. In step 1406, the mobile unit 102a sends a time stamp to the server 112 indicative of a time at which the signals making up the wireless fingerprint where captured by the mobile unit 102a. The server 112 uses the wireless fingerprint and time stamp as well as other wireless fingerprints and timestamps obtained from other devices to determine relative location information indicative of a location of the mobile unit 102a relative to a known location such as a wireless access point. However, as will be disclosed in more detail hereinbelow, a known wireless fingerprint can be prestored. In step 1408, the mobile unit 102*a* receives the relative information from the server 112. In step 1410, the mobile unit 102*a* performs a predetermined action based upon the relative location information. As previously discussed, the predetermined action may include alerting the user 1209*a* of the mobile unit 102*a* of the presence of a user associated with another mobile unit when the distance between the first mobile unit 102*a* and the other mobile unit is determined to be within a predetermined threshold distance.

As noted hereinabove, when a given mobile device enters a particular "locale," it is possible that the proprietary application running on the mobile device will periodically scan for transmitting wireless devices to determine the community of wireless devices that it can receive broadcast information therefrom. A "locale" is defined as a bounded area that may have one or more wireless scannable devices disposed within such bounded area. Additionally, this bounded area is one in which actions for a mobile device may be appropriate, such as locating adjacent mobile devices at a concert, collecting information from mobile devices within the locale, etc.

Once within the "locale," the given mobile device will have potential access to a plurality of different types of wireless transmitting devices. As noted hereinabove, each of these wireless devices will transmit on a particular frequency requiring the given mobile device to have a radio for receiving that particular frequency and transmission type. For example, a Bluetooth device operates under the 802.11 IEEE standard, which is also used for WiFi, this all being referred to as the standard for implementing the wireless local area network (WLAN). The standard operates in multiple frequency bands, 2.4, 3.6 and 5 GHz frequency bands. The 2.4 GHz frequency band is the typical one that is found. Typically, there will be provided on most mobile devices the ability to interface with WiFi hubs via one radio and Bluetooth devices via a second radio. Additionally, there may be a low power radio operating on the 802.15.4 standard. This standard is typically used with the ZigBee type of application. These are typically transmitters that will be associated with personal area networks. There may also be the possibility of detecting a near field communication (NFC) transmitter. Although these types of devices require proximity of no more than a few centimeters, they do provide an identifier that can be detected with an NFC device associated with the particular mobile device.

Once the given mobile device (such as a smart phone) has entered the overall locale, it can detect the transmissions broadcast from the ones of the wireless devices within the locale that are within its receiving range. For example, when a given mobile device is on the edge of a locale, it can only receive a portion of the broadcasts of all of the wireless devices within the locale. Therefore, only a portion of the broadcasting wireless devices within the locale will be within its receiving range, depending on the size of the locale and the dispersement of the various wireless units. For example, in a concert environment, it is possible that a plurality of Bluetooth devices associated with such things as head phones and the such or personal computing devices carried by individuals within the concert locale can be distributed throughout the locale, defined as the bounded area of the concert hall. All of these can be scanned and received by the given mobile device and made part of its fingerprint at a given point in time and at a given position, noting that a change in position or even a lapse of time may result in the wireless fingerprint changing.

In order to further define a particular locale to the server, there can be provided a plurality of fixed wireless devices such as standalone Bluetooth LE emitters or WiFi hubs, these sometimes referred to as "beacons." These fixed devices will have a known or predetermined and fixed ID or MAC address that is known by a server. When this information in the form of imbedded information imbedded in a created wireless fingerprint by the given mobile device is transmitted back to a server, the server can detect the existence of the specific ID and, as such, it will then know that a particular mobile device is within the locale defined by the given mobile device being within the receiving range of the one or more fixed wireless devices associated with the locale just dude to the fact that the beacon is embedded in their current wireless fingerprint. The reason for this is that this particular fixed wireless device has a unique address. Although a WiFi hub could be utilized, there is also the possibility of, for example, a ZigBee 802.15.4 device to be used as just a simple locator or beacon to transmit its information. Additionally, there could be a Bluetooth device provided for that purpose. The difference is that the Bluetooth device has a smaller transmission range as compared to an 802.15.4 device or the WiFi hub. Also, the locale could be defined at the server to be associated with a given mobile device when one or more of the fixed wireless devices are within it's reception range or when there is an overlap of wireless fingerprints and one of the wireless fingerprints has associated therewith one or more of the fixed wireless devices.

The overall purpose of this beacon is to provide to the server the ability to determine "presence" of a fingerprint in its database. Alternative to the beacon is some point of reference fingerprint. This is facilitated by an individual, for example, going to the locale and then walking around the locale and taking a fingerprint and sending to the server with some indication of the event. This is in effect "registering" the fingerprint in such a manner that it is associated with the event. All the server needs is some frame of reference. Also, as more mobile devices enter the locale and the server determines there is an overlap with a sufficient number of the wireless devices, other new wireless devices not originally in the registered" or frame of reference wireless fingerprint can be added. What the server is doing is dynamically creating a database of fingerprints that are known statistically to be in the locale. It could be that the registered or frame of reference fingerprint only covers a small portion of the locale (when referring to the locale from the standpoint of the server, it is defined in terms of the wireless devices that actually define to the server the "presence" of some mobile device in an environment of wireless devices and not necessarily the actual physical boundaries). If, in this example, the frame of reference only covers a small portion of the locale, this will be to the server the definition of the local initially. As other devices move into this locale, they may be on the fringe and pick up more distant (both physically and magnetically—receive range is different) than the original mobile device used as the frame of reference. Thus, this is a dynamically changing locale.

When the server receives any wireless fingerprint from a given mobile device, it stores this fingerprint and then compares this wireless fingerprint with pre stored fingerprints in the database. If there is a beacon in the wireless fingerprint, then this can act as sort of an index for the locale. If not, then the server must search against the entire database using well known search algorithms. However, since each wireless device that makes up the wireless fingerprint has a unique ID, this will allow all stored wireless fingerprints to be pulled up quickly.

Figure 15:
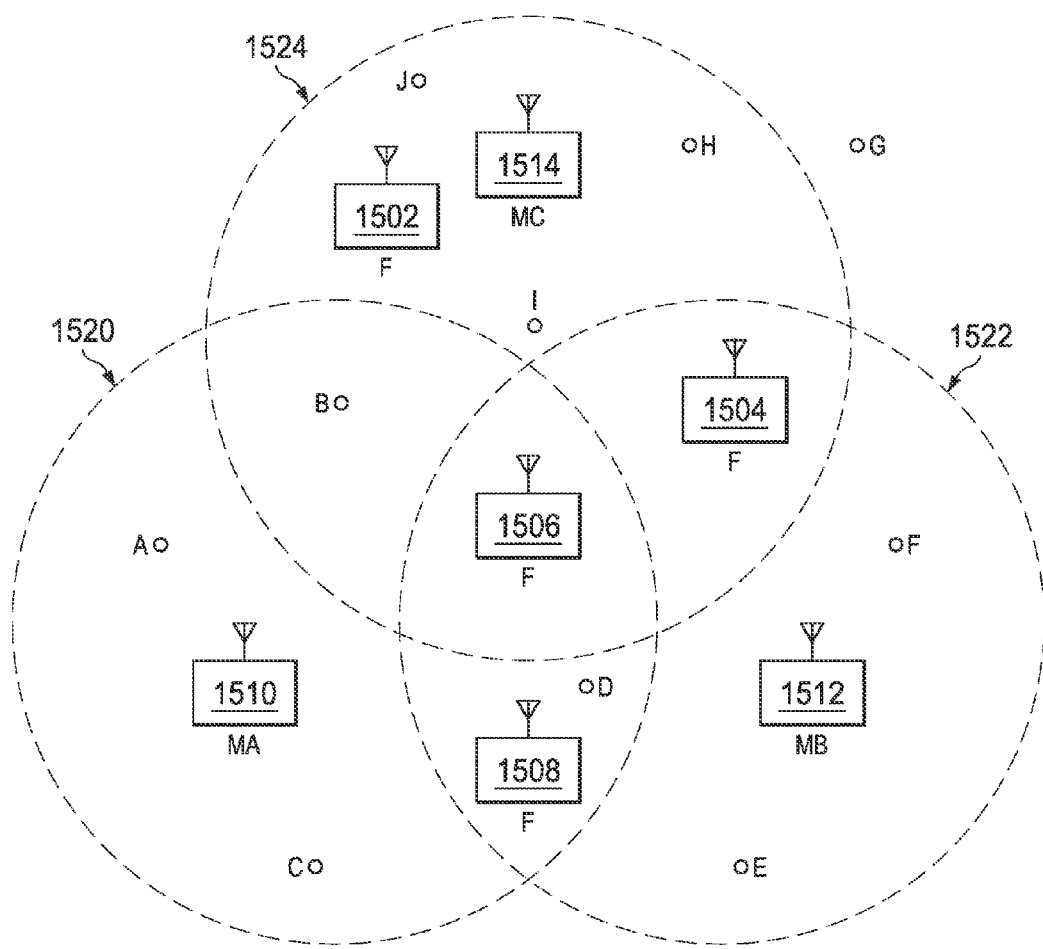
FIG. 15 illustrates a diagrammatic view of a plurality of mobile devices within a defined locale.

Referring now to FIG. 15, there is illustrated a diagrammatic view of a given locale with a plurality of wireless devices having a previously unknown relationship to anything and a plurality of fixed wireless devices that are known to be fixed, i.e. beacons, with respect to the locale and also these fixed wireless devices having unique IDs that are known to a server. The fixed wireless devices are illustrated as four devices 1502, 1504, 1506 and 1508. There are also illustrated a plurality of other wireless devices labeled A through J. These are dispersed about the locale. Illustrated are three mobile devices 1510, 1512 and 1514, labeled MA, MB, and MC, respectively. Each of these mobile devices is disposed within the locale such that it has an associated reception regions illustrated as dotted circular areas that each cover only a portion of the locale. These are areas 1520, 1522 and 1524 which are associated with the mobile devices 1510, 1514, respectively. It can be seen that each of the reception regions 1520-1524 does not receive transmissions from all of the wireless devices, fixed or otherwise, disposed within the locale. For example, mobile device 1510 is able to receive transmissions from unknown wireless devices A, B, C and D and also from the fixed wireless devices 1506 and 1508. Conversely, mobile device 1512 is able to receive broadcast or information only from the unknown wireless device's D, E and F and transmissions or information from the fixed wireless devices 1504-1508. Thus, each of these devices will have a different fingerprint and the only overlapping wireless devices between the two mobile devices 1510 and 1512 within this region will be the unknown wireless device D and the fixed wireless devices 1506 and 1508. As will be described hereinbelow, by comparing the received fingerprints with stored fingerprints, it can be determined that the two mobiles devices are within the same locale at the minimum, since they share at least one fixed wireless device. Additionally, each of the mobile devices 1510 and 1512 will provide with its fingerprint a timestamp such that there is some knowledge as to when the fingerprint was created such that there can be some determination made as to whether the mobile device is still within the range. The reason for this is that the scanning may not be continuous and the device may have moved out of the locale.

For very large concerts, there would be an expectation of a high density of unknown wireless devices. Also, there may be a large number of mobile devices. By looking at the wireless fingerprints of a plurality of mobile devices and knowing the actual physical locations of the fixed wireless devices, a server can obtain a fairly good idea of the relative location of the mobile devices with respect to each other. For example, by knowing that mobile device 1512 can receive transmissions from three mobile devices 1504-1508, a defined loci of points can be determined within which each mobile device 1512 is disposed. This is due to the fact that an actual physical location is known for each of the fixed wireless devices. This is not a triangulation determination, because no determination is made as to the time of receipt of information. However, the characteristics of each of the received transmissions from the fixed wireless devices 1504-1508 is known and the relative transmission strength determined by the mobile device can be utilized by the server to determine a relative distance between mobile devices. An even more refined location can be determined using that information.

Consider the alternative example, wherein the server does not know the identity of the fixed wireless devices or that they have any relationship to the locale. In this example, consider that the mobile device 1510 is the event planner and this is the only relationship known. So, when the event planner enters the locale, there will be at least one fingerprint transmitted and actually multiple ones as the planner "roams" about the physical area. Once the at least one wireless fingerprint is stored, there is a "presence" registered at the server. This first fingerprint will see the two fixed wireless devices 1506 and 1508, but it just recognizes them as unknown devices. Then, the second mobile device 1512 comes into the area. However, until the mobile device 1512 overlaps at least one of the fixed or unknown devices, the locale will be solely defined in this example to that associated with the wireless fingerprint defined by the area 1520. As soon as the mobile device 1512 gets near the mobile device 1508, it will first see the unknown device "D" and this may be enough for the server to declare that the mobile device 1512 is in the locale and also expand the boundaries of the locale. As the mobile device moves closer and is positioned as shown in FIG. 15, the wireless fingerprint will be defined by region 1522. This will constitute another fingerprint for storage at the server and it will also provide more information to the server as to the relationship between the two mobile devices 1510 and 1512. The server will ascertain that the mobile device 1512 is coming in the direction of mobile device 1510 as it incorporates more of the unknown wireless devices such as "C" and "B." When it gets close enough, it will even pick up mobile device 1510.

Additionally, when one of the mobile devices runs its application and registers with the server, it will also register its unique ID information such as its MAC address such that another mobile device containing that MAC address in its fingerprint will allow the server to push information to other mobile devices in the "locale" as to the presence of a new mobile device.

Figure 16:
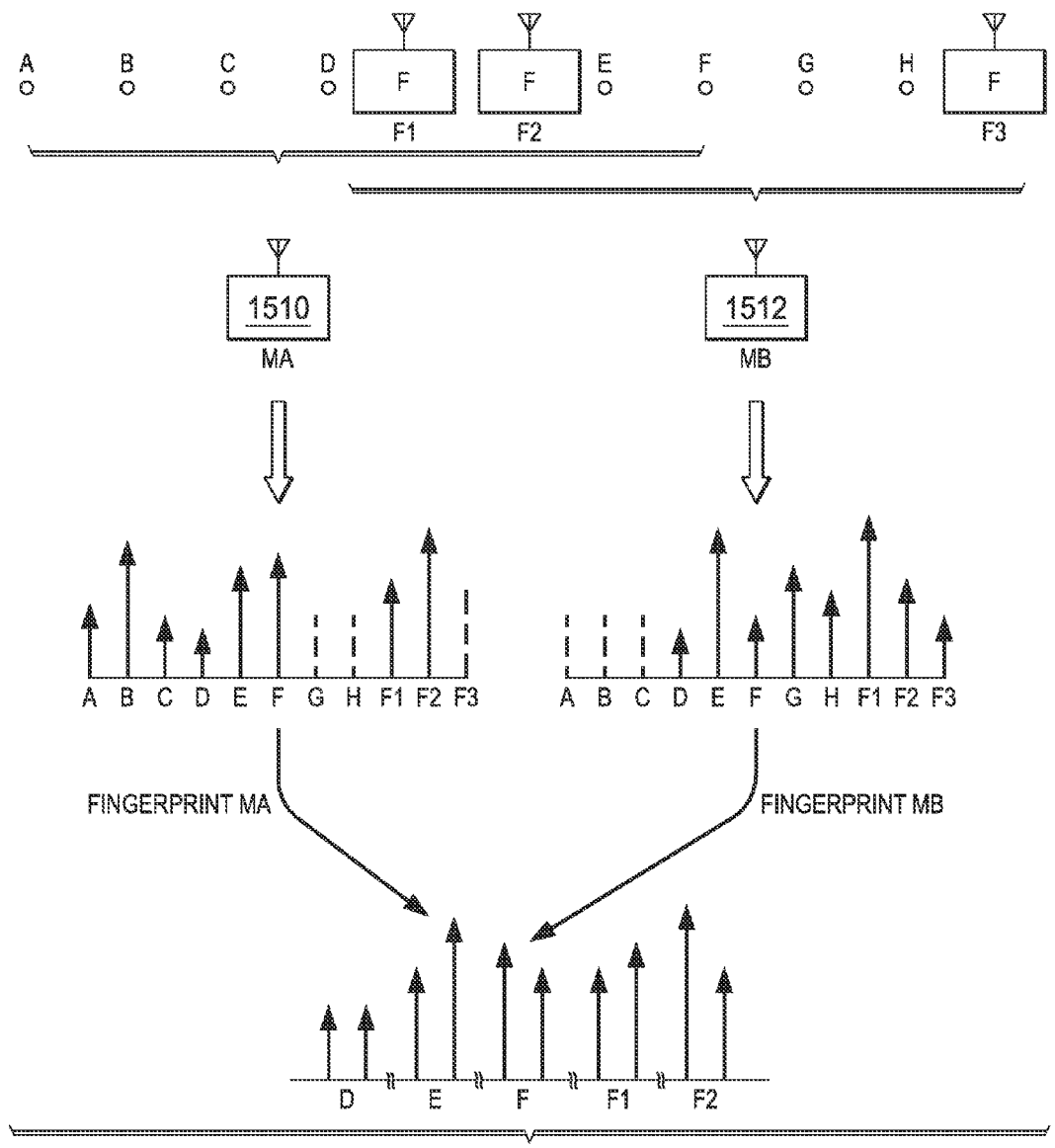
FIG. 16 illustrates a diagrammatic view of the creation of fingerprints of overlapping devices in the locale.

Referring now to FIG. 16, there is illustrated a diagrammatic view of the fingerprints that are created by two of the mobile devices 1510 and 1512. In this particular example, a different position within the locale is illustrated and it is illustrated that mobile device 1510 can receive transmissions from six of the unknown wireless devices labeled A, C, D, E and F, and mobile device 1512 can receive transmission or information from unknown wireless devices D, E, F, G and H, being noted that unknown wireless devices D, E and F are overlapping between the two which will be noted in the associated wireless fingerprints. Additionally, there are provided two fixed wireless devices F1 and F2 that are within the receive range of the mobile device 1510 and three of the fixed wireless devices F1, F2 and F3 within the receive range of the mobile device 1512.

Each of the mobile devices 1510 and 1512 is operable to collect information in the form of addresses, identification information and the such and other characteristics from each of the transmitting wireless devices that it is able to scan and receive information therefrom. This information is accumulated and sent as a table in the form of a fingerprint to the server. This fingerprint is illustrated by illustrating the various RF strengths of the different signals that are received. This basically forms a wireless fingerprint with each of the elements of the fingerprint being identifiable by a unique ID within the locale and a signal strength. In a particular locale, the fixed wireless devices are fixed with unique addresses that can be distinguished between other locales such that the locale can be discriminated from a group of locales based upon the information received about the fixed wireless device.

It can be seen that, between the two fingerprints, there are some overlapping received wireless devices, unknown wireless devices D, E and F and fixed wireless devices F1 and F2. This is shown as an overlapping diagram wherein the server can determine that the overlapping signals for unknown wireless device D are at approximately the same RF strength, where the received signal strengths (RSS) for the unknown wireless devices E and F are different. This is also the case with the fixed wireless devices F1 and F2. By knowing, first, that there are some overlapping devices, it is known that the two mobile devices are at least in some close proximity to the three unknown wireless devices D, E and F and also with respect to the fixed wireless devices. This provides some level of information. As the mobile devices move, more or less unknown wireless devices and fixed wireless devices will be part of the fingerprint. For example, just the fact that there may be a determination of two mobile devices receiving strong signals from a common unknown wireless device would indicate that the mobile devices are in very close proximity to each other with respect to that unknown wireless device, where the same thing could be said with respect to the fixed wireless devices. However, with the fixed wireless devices, the mobile devices could be on opposite sides of the commonly detected fixed wireless device at the same distance therefrom noting that the fixed wireless device would have a broader transmission range. The unknown wireless devices, however, depending upon the type of device, could have a much narrower transmission range. If the information, for example, indicated that the unknown wireless device were a Bluetooth device, this could be utilized to make a determination that these two devices are very close to each other. Any action to be taken could be taken based upon that fact itself.

Figure 17:
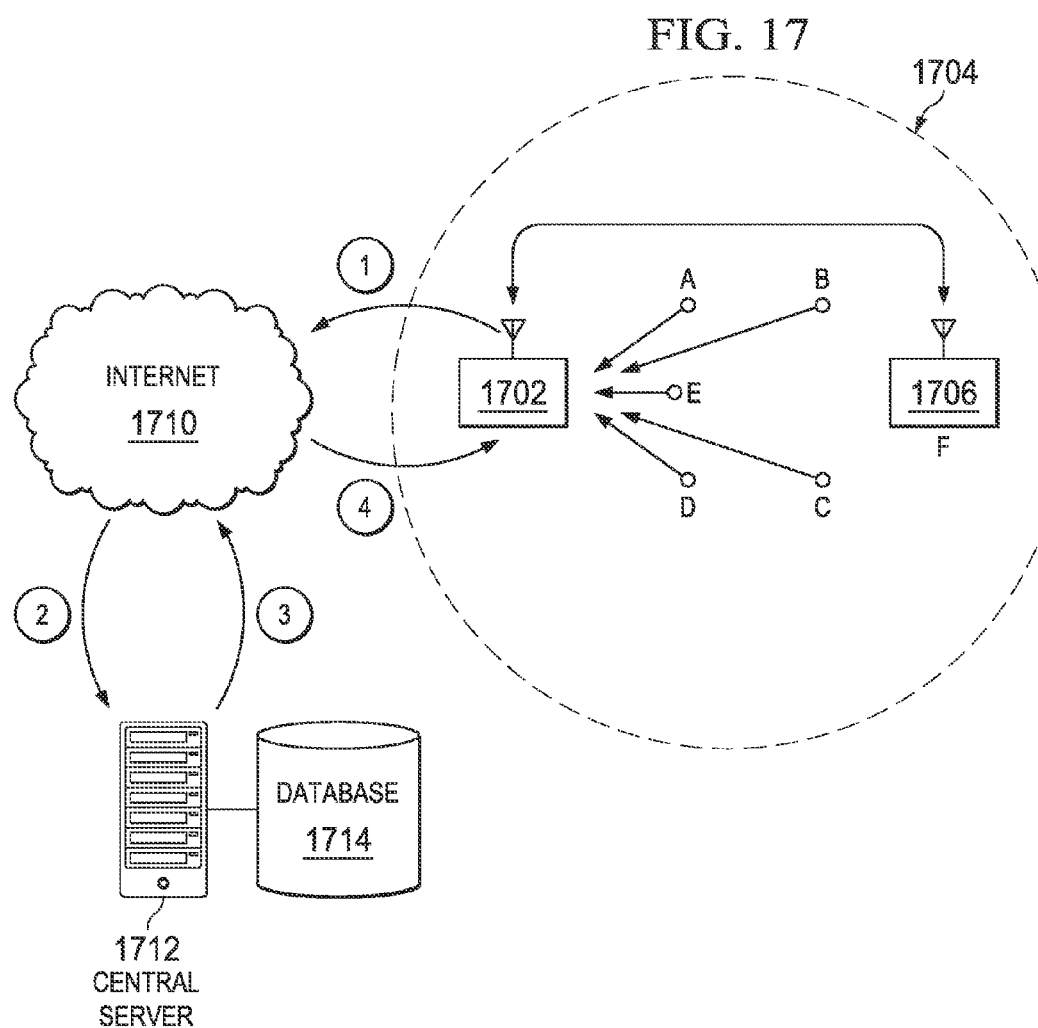
FIG. 17 illustrates a diagrammatic view for the mobile devices in the local interfacing with a network.

Referring now to FIG. 17, there is illustrated a diagrammatic view of the network and dataflow of information for creating fingerprints, sending them to the central server and then returning information. The locale is indicated by the portion of the locale that is within the receiving range of a mobile device 1702 and illustrated by a dotted circle 1704. There are illustrated five unknown wireless devices A, B, C, D and E which can be scanned, the information retrieved therefrom is utilized for the fingerprint. Additionally, there is provided a fixed wireless device 1706 that can be communicated with for the purpose of scanning and information retrieved therefrom as to its characteristics and its RF strength by the mobile device 1702, which information is also part of the wireless fingerprint. This information can then be accumulated in a table and sent to a central server on a first transmission path "1" to a network such as the Internet, labeled as cloud 1710. This is interfaced with the central server 1712 and the information goes from the cloud or network 1710 over to the central server 1712 via a path "2." The central server then processes this information via stored fingerprints in a database 1714 to do the comparison and the various determinations, for sending information back to the mobile device 1702 via a path "3" 2 and a path "4" 2 to the mobile device 1702. The mobile device 1702 can communicate in multiple ways. Some mobile phones have the ability to transmit via a data communication path over a mobile telephone network or they can switch to a WiFi connection. For example, it could be that the fixed wireless device 1706 is a WiFi hub that could be part of the scanning information obtained and also it could be the network communication for interfacing with the network 1710. What is important is that there is some communication with a central server 1712. Additionally, it is not unreasonable to expect that some fingerprints could be stored on the mobile device 1702. This may require a large amount of storage. Further, other mobile devices 1706 typically cannot communicate directly with the mobile device 1702 until there is some knowledge of its location relative thereto.

The central server 1712 can merely return the matching fingerprints for processing at the mobile device if the processing power associated therewith is sufficient and the determination made at the mobile device 1702 as to a comparison between the fingerprints. Alternatively, the central server 1712 can compare multiple fingerprints and make a determination and send back just proximity information to a particular mobile device 1702 relative to some other mobile device within its proximity or even make a determination as to its proximity to a fixed wireless device 1706. Further, an action can be determined from a group access at the central server and an action sent to multiple mobile devices to take some type of group action such as, for example, collecting photographs and transmitting them to a central location with respect to the event. For example, in a concert environment, multiple mobile devices may be taking and collecting photographs. These can be made part of a photo stream to a central location. Some mobile devices such as smart phones have the ability to synchronize with their PC such that, each time a photograph is taken, it is streamed to a particular location. By knowing that a particular group mobile device 1702 or group of mobile devices 1706 having cameras associated therewith are within a particular locale and proximate to each other, commands can be sent to collect photographs from these particular mobile devices therein. Consider, for example, the situation where a concert is being attended by a plurality of mobile devices. If a determination is made that the mobile devices are on one side of the concert area because a fixed wireless device allows the determination made as to proximate location, it could be that photographs from this area are important. It can also be important that photographs disposed in close proximity to a particular mobile device are important such that one mobile device may want to have access to other mobile devices that are in close proximity thereto. By knowing just from scanning of unknown wireless device without actual location information as to the physical location of these devices, proximity information can be determined and utilized for various actions, such that it can go to a photo collection operation.

Additionally, it may be that the action is, after recognizing that the mobile device is in a particular locale associated with a particular event, to cause any photographs to be tagged with some kind of identifying event information. Suppose the locale is associated with a museum. Just by entering the locale of stored fingerprints, event information can be pushed to the mobile device to tag its picture with some type of museum identifier. Any type of action can be taken, either by pushing the action to the mobile device—a command—or just making the mobile device aware of the fingerprint locale within which it currently resides. Once presence in a fingerprint locale is determined, multiple actions can be taken. Even advertising can be pushed to the mobile device.

Figure 18:
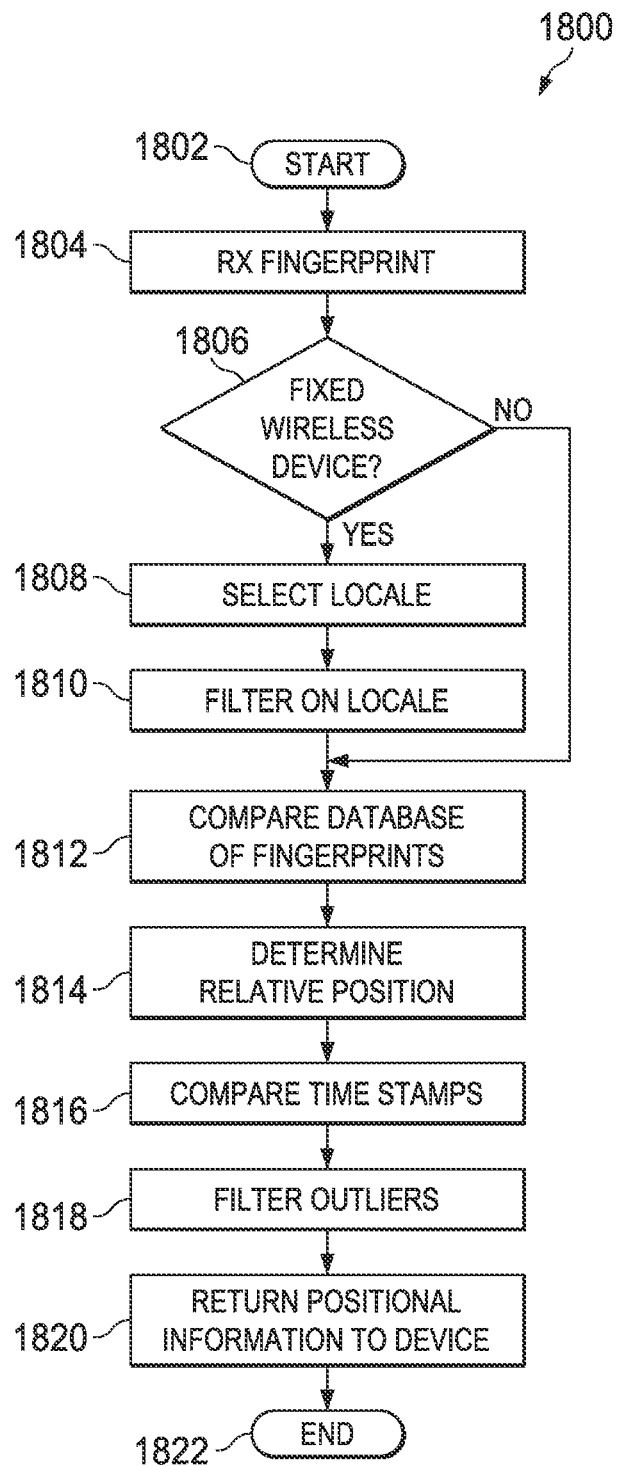
FIG. 18 illustrates a flow chart depicting the general operation of the server.

Referring now to FIG. 18, there is illustrated a flow chart depicting the operation at the server, which is initiated at a block 1702 and then proceeds to a block 1804 to receive and store the fingerprint and then proceeds to a function block 1806 to determine if this is a fixed wireless device or if it is the point of reference fingerprint. If yes, the program flows to a function block 1808 to select the locale, if based upon the fixed and known wireless device, or define the locale if the fingerprint(s) are from a known mobile device that is designated to define such, in which this particular mobile device is disposed. This allows filtering, which is indicated at a block 1810. By providing a filtering operation, less fingerprints need to be analyzed. If there were no fixed wireless devices detected for the reason that a fixed wireless device is not disposed at a particular location or the mobile device is just not within the range of the fixed wireless device, then a number of fingerprints that would have to be analyzed for any proximity determination would involve much more data. After the filtering operation or after determination that no fixed wireless device ID were received, the program flows to a function block 1812 in order to compare a current fingerprint with the database of the fingerprints. A determination can then be made as to a relative position, as indicated by block 1814. The program then flows to a function block 1816 to compare time stamps which are provided with the fingerprint received in block 1804 and other time stamps and fingerprints that have a true comparison as to common fingerprints. This allows the wireless fingerprint outliers to be filtered as indicated by block 1818, i.e., if it is stale, it is considered to no longer be in the locale. If the time window between the receipt of a particular fingerprint and the storage of another similar fingerprint are too great, this stored fingerprint is eliminated as to a comparison operation. The program then flows to a function block 1820 wherein position information will be returned to the given mobile device. The program then flows to END block 1822.

Figure 19:
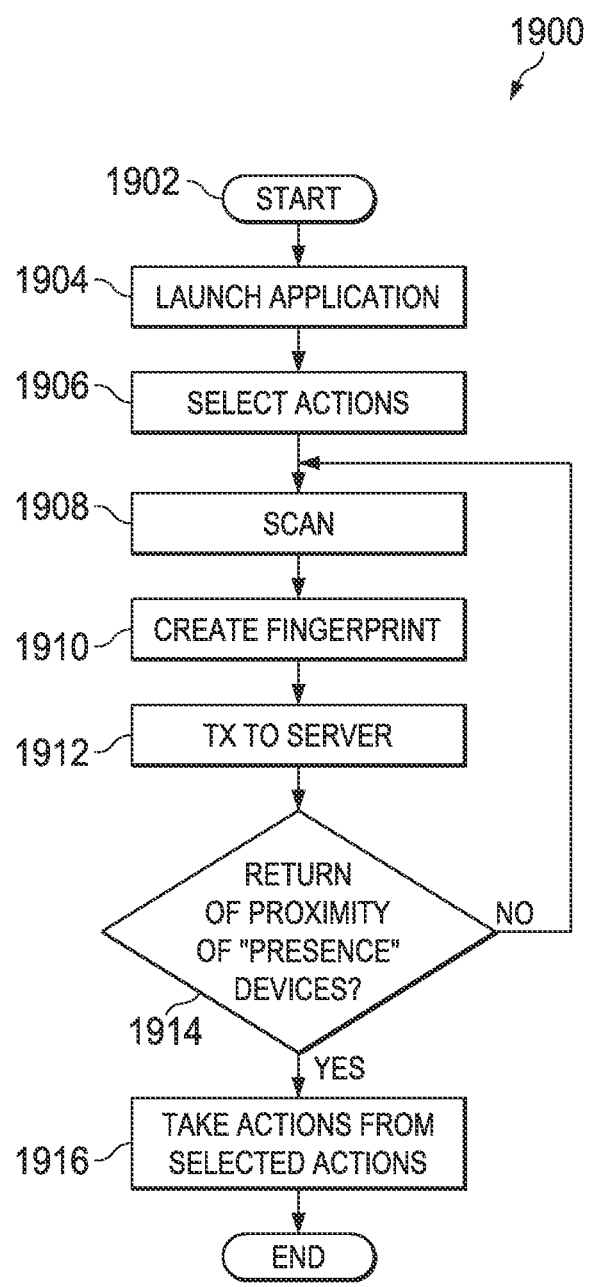
FIG. 19 illustrates a flow chart depicting generation operation at the mobile device for creating fingerprints and taking actions.

Referring now to FIG. 19, there is illustrated a flow chart for the fingerprint generation operation at this mobile device or smart phone, in one example. The program is initiated at a block 1902 and then proceeds to a block 1904 to watch an application on the particular mobile device. These mobile devices typically do not have the application implemented as a native application. These applications are proprietary applications that are run. This proprietary application is operable to utilize the scanning abilities of the particular mobile device and the radios integrated therewith in order to scan all channels that are available to determine if wireless devices are on those channels. The information can then be collected.

Once the application is launched, part of the application, in one embodiment, is to select various actions associated with the application, at a block 1906. For example, it might be that the particular application was launched at a concert and this was a specific application for that concert that was for the purpose of collecting information, accumulating pictures, obtaining information about mobile devices that are in close proximity thereto or even determining if known mobile devices are in close proximity thereto (i.e., "friends"). These actions will be associated with prestored information at the server. The program then flows to a function block 1908 to scan the portion of the locale within its received range. The program then flows to a function block 1910 to create the fingerprint, i.e., accumulate all necessary information in the form of the identifying information from the broadcasting device and the RF characteristics and then this is all transmitted to the server at a function block 1912. The mobile device will then wait for the return of some type of proximity information or some type of action indication at decision block 1914. This proximity information indicates the proximity of the "presence" devices, i.e., devices that are within the presence of the current device. If none are found, the program will flow back to the scan block. If found, then the program flows to a function block 1916 to take care of this action from the action selector. For example, it may be that knowing a particular mobile device is close to a particular unknown wireless device in a particular fingerprint, an action might be to download pictures or to tag pictures.

Figure 20:
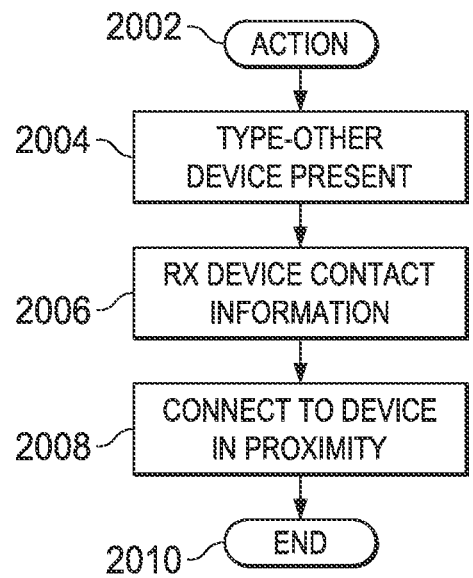

Referring now to FIG. 20, there is illustrated a flow chart depicting one action which is initiated a block 2002 and then flows to a block 2004 to determine the type of action, this being the action as to determining whether another device is present, that being a mobile device. The action is to receive device contact information at a block 2006 and then to connect to that device 2008. Once information is returned from the server as to a particular device that is present, information can be provided to that particular mobile device such as smart phone information that is necessary in order to contact that smart phone, the other mobile device, directly. The program then flows to a block 2010.

Figure 21:
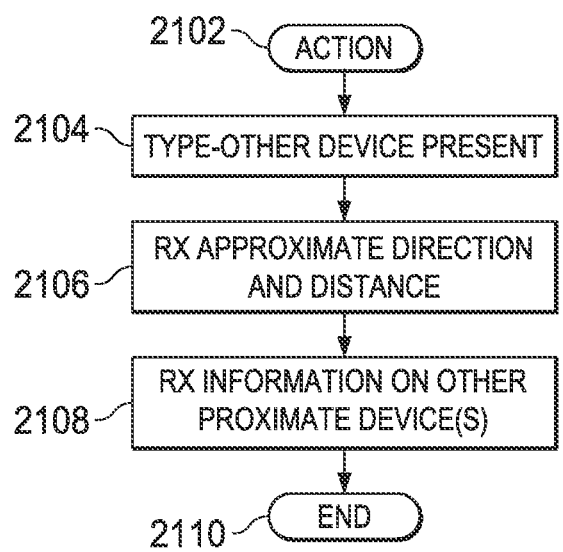

Referring now to FIG. 21, there is illustrated a flow chart for another action, initiated at a block 2102. This is also for determining if another device is present, indicated at a block 2104. This action requires the device to receive the approximate direction and distance of another mobile device that is in the presence of a current mobile device. For example, it could be that, based upon the overlapping fixed wireless device and unknown wireless device, a direction and approximate distance could be determined. Even if it were that your friend, having a known mobile device ID, were within 20 feet, this could be the information that is provided, indicated at a block 2106. This information is received at all of the other mobile devices that are within a certain area. As noted, with the use of the fixed wireless devices having a known position, direction actually can be determined. This is indicated at block 2108. The program the proceeds to an End block 2110. Further, just having a large amount of information from just wireless fingerprints, a pseudo spatial map could be made.

Figure 22:
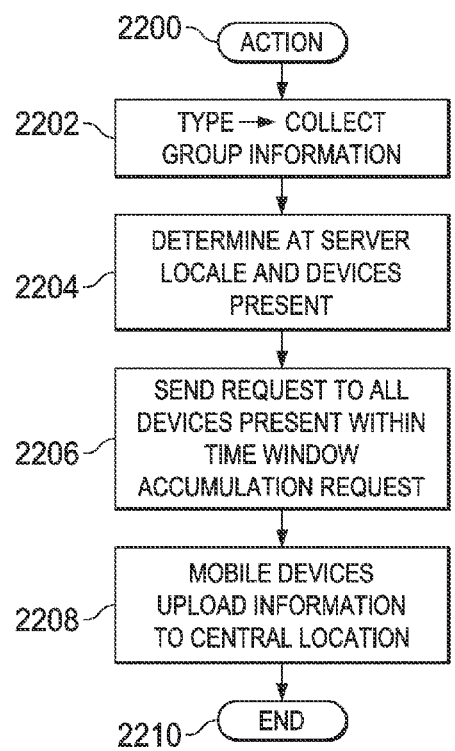
FIGS. 20-22 illustrate flow charts for various actions.

Referring now to FIG. 22, there is illustrated a flow chart for another action block which is the one associated with the collection of group information. This is initiated at block 2202 and the proceeds to block 2204. This is an operation wherein a determination is made at the server as to the locale and the devices that are present in that locale, as indicated at block 2206. In this application, by way of example, a determination is made that there are a plurality of certain devices that are present. By knowing these particular mobile devices and the fact that they may in fact have a camera associated therewith in one application, a request can be sent to all of these devices present within a particular time window to collect data. This is an accumulation request. The accumulation could be a request for photo information, for example. A command is then sent to the mobile devices to upload information to a particular central location. It could be that these particular mobile devices are smart phones and have already provided data to a central location and this could be interfaced with. However, it could be that the application running on the smart phone, the proprietary application, could actually transmit these collected pictures to a defined location by the application. This is the particular action that is taken, as indicted by a block 2208. The program then flows to an End block 2022.

Although the preferred embodiment has been described in detail, it should be understood that various changes, substitutions and alterations can be made therein without departing from the spirit and scope of the invention as defined by the appended claims.

What is claimed is:

1. A method for determining proximity of two or more mobile units within a defined locale, the locale having a plurality of wireless devices disposed therein, each having the capability of broadcasting unique information over a broadcast channel, comprising the steps of:
   each of the two or more mobile units operable to:
      scan at least a portion of the locale associated with the scanning one of the two or more mobile units,
      detect the presence of the ones of the plurality of wireless devices within the associated at least portion of the locale, the step of detecting receiving and accumulating the unique information from the detected ones of the plurality of wireless devices,
      assemble the received unique information into a wireless fingerprint, and
      transmit the wireless fingerprint to a server;
   at the server, the server having a database of stored wireless fingerprints:
      receive wireless fingerprints from mobile units,
      compare received fingerprints with the stored wireless fingerprints,
      determine stored wireless fingerprints that are within the locale;

determine the relative position of the mobile devices associated with stored wireless fingerprints determined to be within the local, and transmit the relative positions of the other of the two or more mobile units relative to the scanning one thereof.

2. The method of claim 1, wherein the step of receiving and accumulating the unique information comprises receiving the received power levels of the detected ones of the plurality of wireless devices and the step of assembling operable to assemble the unique information with receive power levels into the wireless fingerprint.

3. The method of claim 1, wherein the wireless devices are selected from the group consisting of Bluetooth devices, WiFi devices and mobile telephone devices.

4. The method of claim 1, and further comprising stamping the wireless fingerprint with the time of creation thereof as a time stamp and the step of transmitting the wireless fingerprint also transmitting the associated time stamp.

5. The method of claim 1, wherein there is disposed in the locale at least one of the wireless devices as a fixed wireless device, the location of which is known by the server, and wherein the server further determines the location of the two or more mobile units detecting the fixed wireless device within the scanned at least portion of the locale relative to the fixed wireless device.

6. The method of claim 1, and further comprising selecting an action from a set of predetermined actions based on the determination of proximity of a plurality of mobile units in proximity to each other and transmitting a command associated with such action.

7. A method for determining a location based upon scanned wireless signals comprising:

receiving a first wireless fingerprint from a first mobile unit, the first wireless fingerprint including identifying information of at least a first wireless signal received by the first mobile unit;

receiving a first time stamp indicating a time of reception of the at least a first wireless signal or device ID by the first mobile unit;

receiving a second wireless fingerprint from a second mobile unit, the second wireless fingerprint including identifying information of at least a second wireless signal device ID scanned by the second mobile unit;

receiving a second time stamp indicating a time of reception of the at least a second wireless signal by the second mobile unit;

determining relative proximity of the first mobile unit using the first wireless fingerprint, the first time stamp, the second wireless fingerprint, and the second time stamp; and sending information indicative of the relative proximity to the first mobile unit.

8. A method for interfacing with a plurality of mobile wireless devices and controlling actions thereof based on the presence thereof in a particular locale, comprising the steps of:

each of the mobile wireless devices when entering the locale:

scanning wireless devices within the locale within a scanning range associated with the scanning one of the mobile wireless devices, creating a wireless fingerprint of the scanned wireless devices representing identifying information and scan characteristics of the scanned wireless devices, and transmitting the wireless fingerprint to a server for storage in a wireless fingerprint database; and at the server:

determining from the received fingerprint if the transmitting one of the mobile wireless devices is within at least a portion of the locale by comparing the received wireless fingerprint with known stored wireless fingerprints, determining if there is an associated action for the locale, if there is an associated action for the locale, transmitting such to all of the mobile wireless devices determined to have transmitted wireless fingerprints from within the locale to al or select ones of the mobile wireless devices; and executing the actions at the ones of the mobile wireless devices to which the action to be executed was transferred.

9. The method of claim 8, and further comprising the step of determining from the received wireless fingerprints if any two or more of the mobile wireless devices are in close proximity to each other and the step of determining the action is based on such proximity.

10. The method of claim 8, further comprising the step of creating a reference wireless fingerprint and registering it with the server, the reference wireless fingerprint defining the boundaries of the locale.

11. The method of claim 10, wherein the step of creating a reference wireless fingerprint comprises the step of creating a plurality of different reference fingerprints at different physical locations in a defined physical area.

* * * * *